United States Patent
Ichapurapu et al.

(10) Patent No.: US 12,120,534 B1
(45) Date of Patent: Oct. 15, 2024

(54) INTERACTIVE PHYSICAL PLACEMENT OF DEVICES FOR OPTIMAL MOTION SENSING USING CHANNEL STATE INFORMATION (CSI)

(71) Applicant: Amazon Technologies, Inc., Seattle, WA (US)

(72) Inventors: Ravi Ichapurapu, Morgan Hill, CA (US); Durga Laxmi Narayana Swamy Inti, Kakinada (IN); Dhruv Kohli, Fremont, CA (US); Adithya Subramanian, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 212 days.

(21) Appl. No.: 17/387,703

(22) Filed: Jul. 28, 2021

(51) Int. Cl.
| | |
|---|---|
| H04L 12/00 | (2006.01) |
| H04L 67/12 | (2022.01) |
| H04W 24/02 | (2009.01) |
| H04W 24/10 | (2009.01) |

(52) U.S. Cl.
CPC ............. *H04W 24/02* (2013.01); *H04L 67/12* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2018/0365975 | A1* | 12/2018 | Xu | G08B 13/08 |
| 2019/0174330 | A1* | 6/2019 | Wen | H04W 24/02 |
| 2020/0096345 | A1* | 3/2020 | Jadav | H04W 4/02 |
| 2020/0153936 | A1* | 5/2020 | Chen | H04L 67/306 |
| 2020/0305231 | A1* | 9/2020 | Sadeghi | H04W 12/30 |
| 2021/0112097 | A1* | 4/2021 | Jiang | H04L 63/20 |
| 2021/0333351 | A1* | 10/2021 | Zandifar | G01S 7/415 |
| 2021/0405173 | A1* | 12/2021 | Elias | G01S 13/88 |
| 2022/0005337 | A1* | 1/2022 | Shin | H04L 5/0055 |
| 2022/0070633 | A1* | 3/2022 | Ghoshal | H04W 4/023 |
| 2022/0276370 | A1* | 9/2022 | Deixler | G01S 13/56 |
| 2022/0343752 | A1* | 10/2022 | Chen | H04B 17/309 |

FOREIGN PATENT DOCUMENTS

| | | | | |
|---|---|---|---|---|
| CN | 106154222 A | * | 11/2016 | G01S 5/02 |
| CN | 106792505 A | * | 5/2017 | |

* cited by examiner

*Primary Examiner* — Noel R Beharry
*Assistant Examiner* — Lionel Preval
(74) *Attorney, Agent, or Firm* — Lowenstein Sandler LLP

(57) ABSTRACT

Technologies directed to interactive physical placement of devices for optimal motion sensing using channel state information (CSI) are described. A method includes determining that a size of received CSI data exceeds a first threshold or is received in a specified time interval, the CSI data representing channel properties in a wireless network of devices. The method further includes validating a physical placement of the wireless devices by i) determining that a parameter value associated with the CSI data is less than a second threshold representing a no-motion condition and the first CSI data matches ground truth data associated with the no-motion condition; or ii) determining that the parameter value is greater than a third threshold representing a motion condition and the first CSI data matches ground truth data associated with the motion condition. The method sends to a user device an indication that the physical placement is validated.

17 Claims, 20 Drawing Sheets

| Decision Results \ Ground Truth | Motion | No Motion |
|---|---|---|
| Motion | True Negative (TN)<br>- TN is detected with high confidence. | False Positive (FP)<br>- FP of WiFi detection may be reduced through presence confirmation with other sensing technique (ultrasound or acoustics). |
| No Motion | False Negative (FN)<br>- FN may be reduced by analyzing a few samples over a longer time window, instead of making decision for each sample. | True Positive (TP)<br>- TP is detected with high confidence. |

INTERACTIVE PHYSICAL PLACEMENT OF DEVICES FOR OPTIMAL MOTION SENSING USING CHANNEL STATE INFORMATION (CSI)

BACKGROUND

Many buildings such as homes, retail stores, business centers, and the like, have a growing number of wireless transmission devices, including wireless transmitters and wireless receivers. These devices are sending an increasing amount of radio frequency (RF) energy through the buildings from many different directions. Wireless RF signals may be used in motion detectors to help detect human presence.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4B is a decision mapping table to indicate disclosed solutions to the possibility of false-positive or false-negative presence detections, according to various embodiments.

DETAILED DESCRIPTION

Figure 1A:
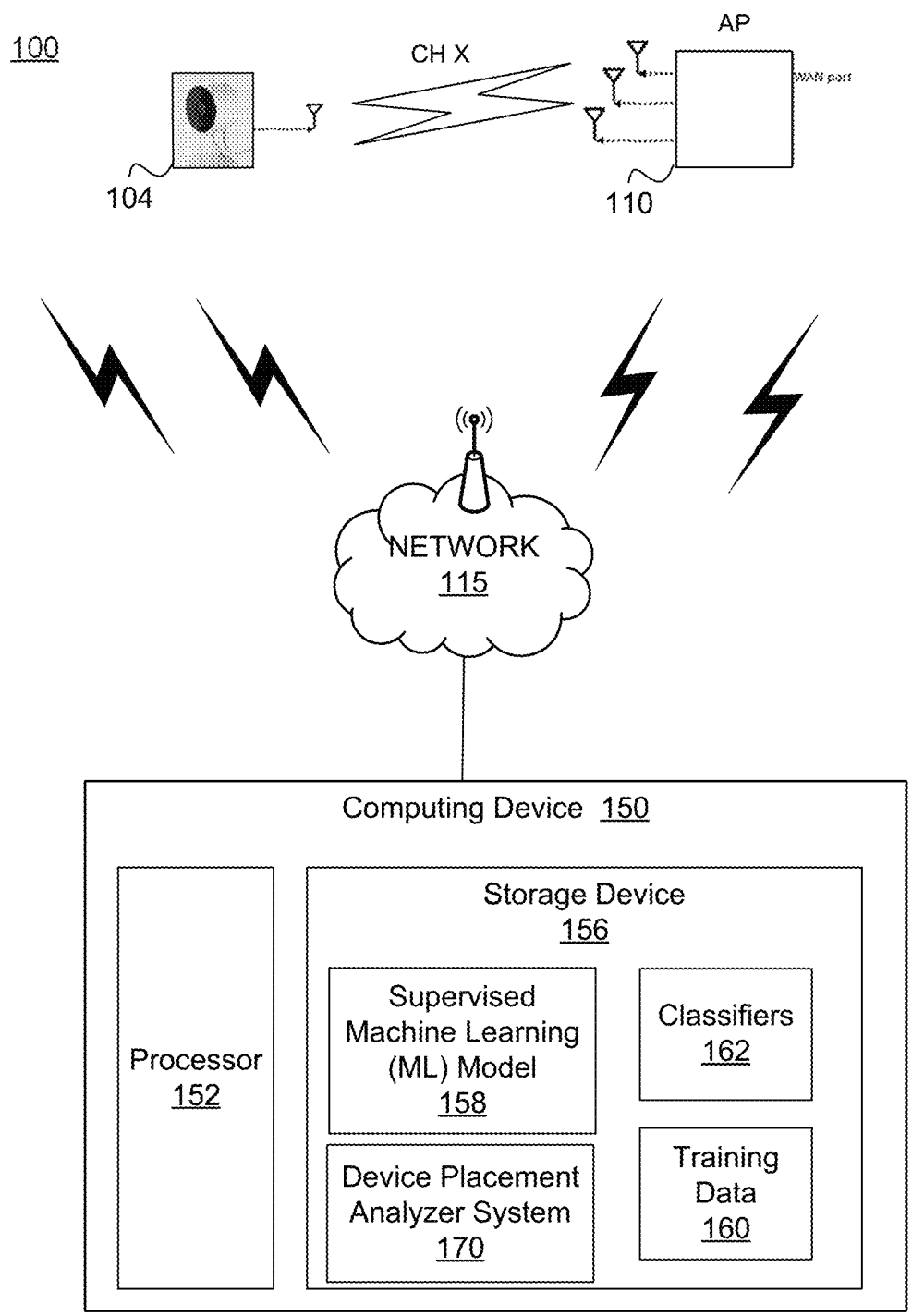
FIG. 1A is a block diagram of a system for placing devices to optimize detecting presence of a human using wireless signals in a wireless local area network, according to at least one embodiment.

A motion detector (e.g., a wireless detector) is a wireless device that detects moving objects, particularly humans. A motion detector may be integrated as a component of a system that automatically performs a task or alerts a user of motion in an area or vicinity. Accordingly, motion detectors may form a component of security, such as a burglar alarm system, of automated lighting control, home control, energy efficiency, and other useful systems.

The presence detection performed by motion detectors may be based on a number of different possible technologies, including, for example, passive infrared (PIR), microwave, ultrasonic, tomographic, video camera software, and gesture detection. A tomographic motion detector may sense disturbances to radio waves that pass from node to node in a mesh network. More generally, wireless radio frequency (RF) signals (or simply "wireless signals") may be employed to not only detect presence within line of sight, such as in the same room or space, but also in adjacent room(s) because wireless signals may pass through walls. These RF signals may be generated via a WLAN employing technology such as 2.4 GHz or 5.0 GHz WiFi®, Bluetooth®, ZigBee®, Zwave® and the like. The use of wireless signals for presence detection may be an attractive option due to the ubiquity of wireless transceivers such as access points (AP) or base station devices that are present in so many buildings and homes.

Furthermore, the RF channel properties available through radio transmission channels may contain data that may be employed in machine learning techniques used to train, for example, a supervised machine learning (ML) model for presence classification. Examples of data that may carry RF channel properties include Received Signal Strength Indicator (RSSI) data, Channel State Information (CSI), or a combination of both, as will be discussed in more detail. Additional sources of signal characteristics, power, or channel properties or other channel information may also be employed, and therefore, RSSI and CSI are but a listing of understood and available forms of channel properties. RSSI is a measurement value of power present in received wireless signals, and contains a single value per packet. For example, RSSI can be measured as the power level of a radio frequency that a client device receives from an access point, such as a wireless router. RSSI may be a measurement of the energy observed at the antenna by a wireless physical layer (PHY) of the receiver used to receive a current Physical Layer Convergence Protocol (PLCP) Protocol Data Unit (PPDU) of the receiver. In a typical home WLAN, the client device generates the RSSI either based on the data frame received or the beacon from the AP. The RSSI fluctuates when the environment changes. Such changes can be caused by many factors: moving transmitter or receiver, moving objects nearby the AP or client, changing ambient noise level, etc. As opposed to the RSSI which is a single value available per packet, the CSI includes the detailed channel impulse response with both amplitude and phase information across all the Orthogonal frequency-division multiplexing (OFDM) subcarriers and is updated (at the maximum rate) every OFDM symbol. This provides more information about the environment under surveillance. Therefore, by use of CSI, a better detection can be accomplished. For example, CSI signal can distinguish a person is watching TV or washing dishes. However, RSSI based method is not able to distinguish them.

CSI data is a granular, real-time data on amplitude and phase of each channel subcarrier between the WLAN transmitter and receiver. Raw CSI data, provided by the chipset, is fed to a signal processing engine for noise reduction, signal transforms, and/or signal extraction. The current implementations take these processed CSI data and run it through a machine learning (ML) model to determine whether the environment has been disrupted to the point of perceiving motion. This ML model can be "tuned" to prioritize latency, accuracy/sensitivity, using hysteresis or by applying a user-provided threshold for notification.

CSI-based motion detectors do not require an "active transmitter" like a phone to be on a person in order to detect and track them. Rather, CSI-based motion detectors work based on disruption to the channel state information and multipath effects of WLAN transmission between APs, smart speakers, streaming devices, or the like. However, there are some dependencies on device placement, unexpected channel and home conditions which impact the detection accuracy and also lead to high false trigger rate.

Aspects of the present disclosure can overcome these challenges and others by providing a system that guides a user with the physical placement of devices to optimize the performance as per the local conditions. One method includes determining that a size of received CSI data exceeds a minimum threshold or is received in a specified time interval, the CSI data representing channel properties in a wireless network of devices. The CSI represents channel properties of a wireless channel used by a first wireless device and a second wireless device in a wireless network. The method further includes validating a first physical placement of the wireless devices by i) determining that a parameter value associated with the CSI data is less than a first threshold (e.g., a minimum threshold) representing a no-motion condition and the first CSI data matches first ground truth data associated with the no-motion condition; or ii) determining that the parameter value is greater than a second threshold (e.g., maximum threshold) representing a motion condition and the first CSI data matches second ground truth data associated with the motion condition. The method sends to a user device an indication that the first physical placement is validated. The validation of the physical placement can ensure that the devices are capable of supporting CSI-based applications, such as motion detection and no-motion detection, and in some cases are optimized for these CSI-based applications. When a physical placement of devices is not validated, there is no guarantee that the wireless device can support CSI-based applications, such as motion detection based on CSI data. The physical placement of devices in geographic locations can be validated to optimize performance of the CSI-application within the WLAN. The indication that the physical placement is validated can be presented to a user to initially locate devices within a room for CSI-based application or to adjust the physical placement of devices to improve performance of the CSI-based application. In some embodiments, the first and second ground truth data can be received from the user during training. For example, the user can indicate that the CSI data collected occurred when there is motion in a room or the CSI data collected occurred when there is no motion in the room. If the first CSI data does not seem to match the ground truth data provided by the user, the process can continue to analyze the CSI data using the ML based processing described herein. In at least one embodiment, the threshold value can be changed or the user can be instructed to change the placement of the devices and validate the new placement of devices.

In various embodiments, to reduce the possibility of false positives, the present methods and systems (e.g., wireless detector) may validate placement of devices used for detections of a motion or no-motion condition using a three-level analysis, including a RF link analysis, a numerical analysis, and, if needed, a machine learning based analysis which includes classification of channel properties within wireless signals in a building. The channel properties may be present in data received within a communication link between the wireless detector, e.g., a first wireless device, and a wireless transmitter in an AP-type device, e.g., a second wireless device. The wireless detector may classify, by a processor of the wireless detector executing a supervised ML model, the first data to distinguish human movement within the building from stationary objects, to detect presence, motion or no-motion of a human. The wireless detector may then output a signal indicative of confirmed presence, motion, or no-motion of the human in the room of the building. The output signal may be adapted to turn off the lights, signal a security system, or adjust a thermostat associated with the room in the building.

FIG. 1A is a block diagram of a system 100 for placing devices to optimize detecting presence of a human using wireless signals in a wireless local area network, according to at least one embodiment. The system 100 may include a wireless detector 104, at least one access point device 110 that includes a transmitter of wireless signals, a network 115 (e.g., WLAN, a wide area network (WAN), or cellular), and a computing device 150. The wireless detector 104, which may be a WLAN receiver, may be located in a room (or other space) in or near a building in order to detect presence associated with the room (or other space). The access point device 110, which may be a WLAN transmitter, may transmit wirelessly over multiple channels, at least one of which is received by a receiver within the wireless detector 104. The access point device 110 may be in the same or a different room than the wireless detector 104.

In various embodiments, the wireless detector 104 may receive first data indicative of channel properties of a communication link between the wireless detector 104 and the access point device 110. The wireless detector 104 (or some remote device to which the first data is transmitted) may classify the first data to determine whether a human presence has been detected. This classification, as mentioned, may be performed using a trained supervised machine learning (ML) model, such as a support vector machine (SVM) model, a neural network (NN) model, or another trained ML model.

The computing device 150, located in the cloud across the network 115, may perform the initial training of the supervised ML model 158 and provide the device placement analyzer system 170 for placing devices to optimize detecting presence of a human using wireless signals in a wireless local area network, as described in more detail below. The computing device 150 may include, for example, a processor 152 and storage device 156. The storage device 156, which may be understood to include computer memory and/or storage, may include a supervised ML model 158 (e.g., code for execution of the supervised ML model), device placement analyzer system 170, training data 160, and pre-trained classifiers 162, which may be used in performing detection and location identification of persons within buildings. The pre-trained classifiers 162 may be hundreds or even thousands of classifiers of types of objects expected to be found in rooms of the building, such as furniture, built-in buildings, plants, indoor trees, moving items (both animate and inanimate, including pets), and different sizes and shapes of humans and those humans moving in different ways. In one embodiment, a classifier for a human may be trained to recognize human movement as distinguished from movement of pets or curtains.

The training data 160 may later be updated over time as people come and go through the room, and the data captured at the wireless detector 104 (and at other wireless detectors and receivers) within the building may include additional data, including channel properties, captured during periods of time in which the room may change, and particularly with reference to detecting people moving within the room. This updated training data may then be used to further train the pre-trained classifiers 162, so that further presence detection may be improved. For example, an updated supervised ML model 158 may be transmitted periodically by the computing device 150 to the wireless detector 104 (or to a remote second device) used to perform classification to determine human presence in the future.

Employing trained ML models to perform presence detection may be performed on different types of channel property data, including Received Signal Strength Indicator (RSSI) data, Channel State Information (CSI), or a combination of both. Additional sources of signal characteristics, power, or channel properties or other channel information may also be employed, and therefore, RSSI and CSI are but a listing of understood and available forms of channel properties.

Accordingly, in one embodiment, the wireless detector 104 may receive and transmit RSSI, which is a parameter (e.g., channel properties) that has a value of zero ("0") to a RSSI maximum value (referred to as "RSSI Max"), and is indicative of the signal strength of a wireless signal associated with a wireless network. Accordingly, RSSI is a measurement value of power present in received wireless signals, and contains a single value per packet. For example, RSSI can be measured as the power level of a radio frequency that a client device receives from an access point, such as a wireless router. In another implementation, RSSI may be a measurement of the energy observed at the antenna by a wireless PHY of the receiver used to receive a current PPDU of the receiver. In one implementation of a home WLAN (e.g., using the WiFi® technology), for example, the wireless detector 104 may generate the RSSI either based on a data frame received or a beacon from an AP node. The RSSI may fluctuate when the environment changes. Such changes can be caused by many factors, such as moving a transmitter or receiver, moving objects nearby the AP or client, a change in ambient noise level, temperature swings, or other such factors that cause fluctuations in RSSI.

In another embodiment or implementation, the wireless detector 104 may measure and transmit CSI, which is data that includes channel properties of a communication link between a transmitter and a receiver. For example, a receiver within the wireless detector 104 may retrieve the CSI from a baseband channel estimator with which to perform presence detection. The receiver may adjust the rate of sampling channel properties by the baseband channel estimator. The CSI may include a detailed channel impulse response with both amplitude and phase information across all the OFDM subcarriers and be updated (at the maximum rate) every OFDM symbol. This may provide more information about the environment under surveillance, and thus may improve detection capability when applying a trained ML model, as discussed herein, to CSI data or CSI-liked data.

As described above, CSI-based motion detectors work based on disruption to the channel state information and multipath effects of WLAN transmission between APs, smart speakers, streaming devices, or the like. However, there are some dependencies on device placement, unexpected channel and home conditions which impact the detection accuracy and also lead to high false trigger rate. The device placement analyzer system 170 provides operations to guide the device placement and optimize the performance as per the local conditions of where the devices are located. Additional details of the device placement analyzer system 170 are described below with respect to FIGS. 1B-11.

Figure 1B:
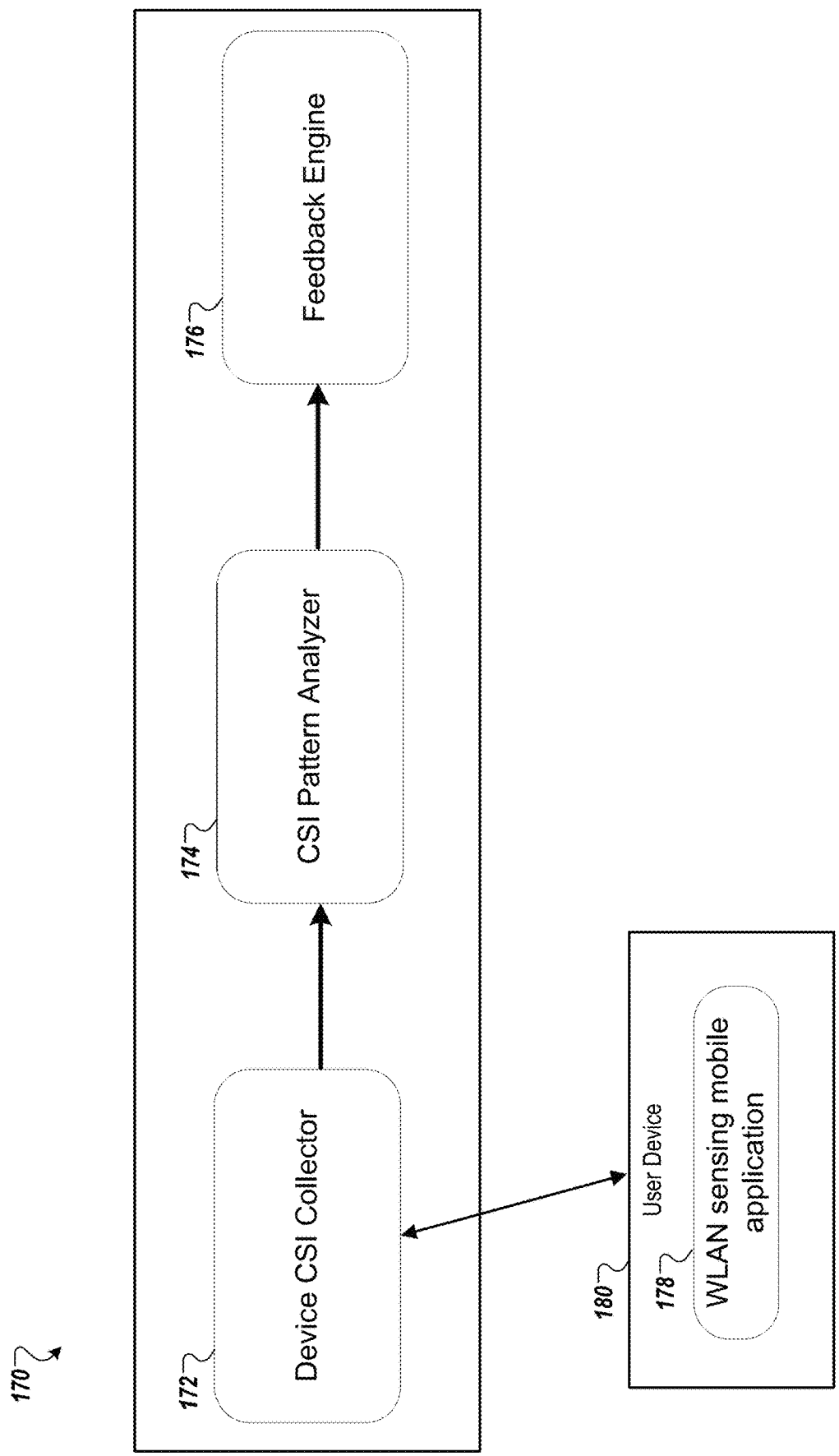
FIG. 1B is a block diagram of a device placement analyzer system, according to at least one embodiment.

FIG. 1B is a block diagram of a device placement analyzer system 170, according to at least one embodiment. The device placement analyzer system 170 for CSI-based sensing includes three main software components, including device CSI collector 172, CSI pattern analyzer 174, and feedback engine 176. The device CSI collector 172 collects data from one or more devices in a WLAN network and the CSI pattern analyzer 174 can be used to validate the placement of one or more devices in geographic locations to optimize performance of the WLAN. The device CSI collector 172 operates in connection with a WLAN sensing mobile application 178 (also referred to as a companion app) on a user device 180 at a location where the devices are being placed. The WLAN sensing mobile application 178 can help guide a user in places devices and testing the placement of the devices for motion and no-motion conditions. The device CSI collector 172 collects the data during the testing and the CSI pattern analyzer 174 analyzes the placement of the devices based on the collected CSI data to optimize performance. Based on the decision made by CSI pattern analyzer 174, the feedback engine 176 communicates the decision to the end customer through the WLAN sensing mobile application 178 for the next steps. The WLAN sensing mobile application 178 can have the instructions for the user to perform the local training to fine tune the ML model for optimal performance.

In at least one embodiment, the device CSI collector 172 can cause the WLAN sensing mobile application 178 to prompt a user for a device placement routine when enabling this feature for the first time. The device CSI collector 172 or the WLAN sensing mobile application 178 can cause the devices being placed to be initially configured in a setup mode in which CSI data can be collected. The operations of the setup mode are described below with respect to FIG. 2.

The WLAN sensing mobile application 178 can provide a user interface to allow the user to input "motion" or "no motion" ground truth information for the CSI pattern analyzer 174.

The device CSI collector 172 can collect RF channel properties (e.g., CSI) of a communication link between the wireless detector 104 and the access point device 110. The device CSI collector 172 can collect RF channel properties of one or more channels between one or more devices in the WLAN. The device CSI collector 172 can receive the RSSIs, CSI data, or the like from a wireless device that collects this data, as described below with respect to FIG. 1C.

Figure 1C:
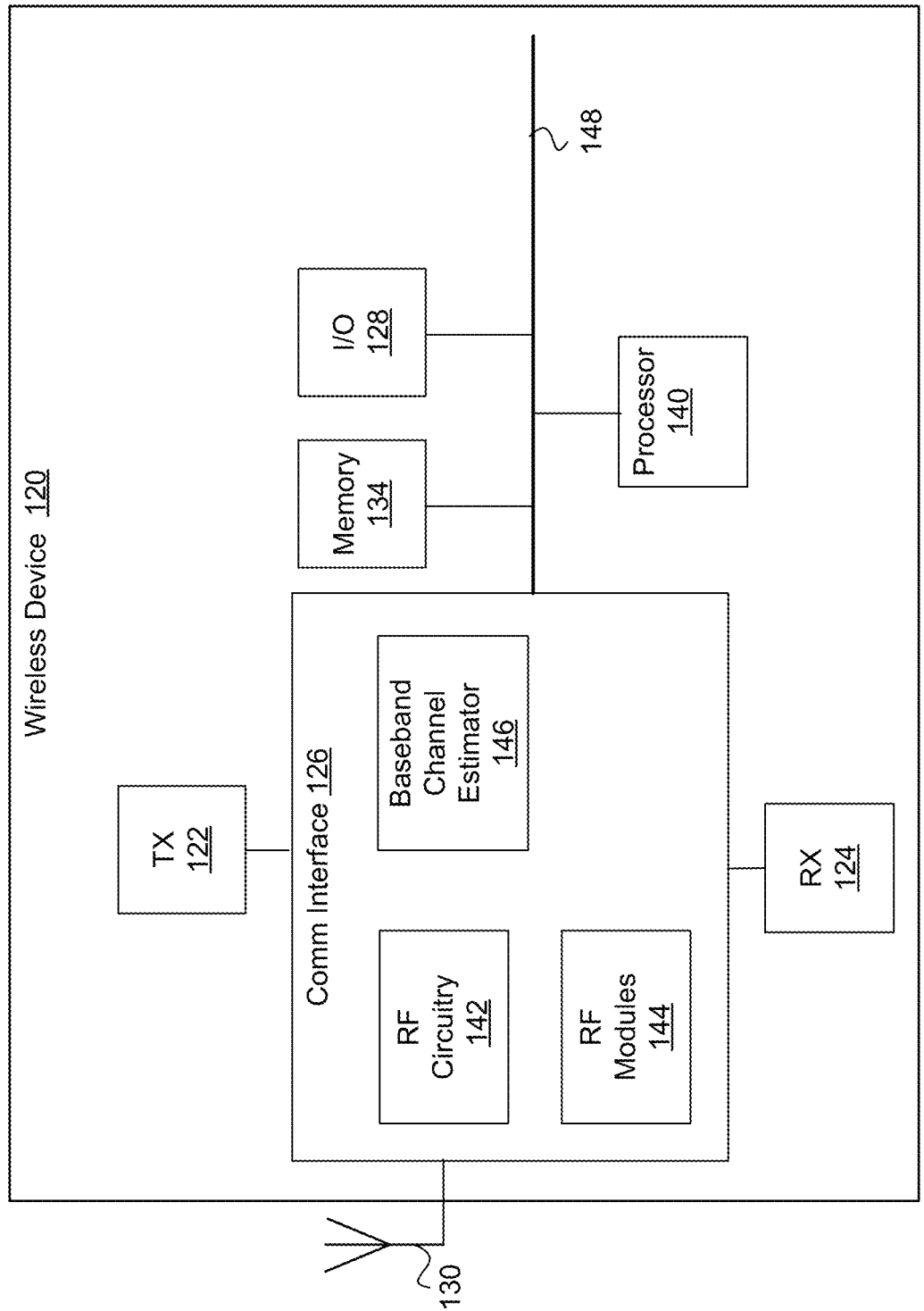
FIG. 1C illustrates a wireless device adapted to detect and transmit channel state information (CSI) or received signal strength indicator (RSSI) data useable by the device placement analyzer system and a supervised machine learning model to perform presence detection, according to at least one embodiment.

FIG. 1C illustrates a wireless device 120 adapted to detect and transmit channel state information (CSI) or received signal strength indicator (RSSI) data useable by the device placement analyzer system 170 and a supervised machine learning model to perform presence detection, according to at least one embodiment. Accordingly, the wireless device may represent the wireless detector 104 or the access point device 110 in different embodiments. The wireless device 120 may include, but not be limited to, a transmitter (TX) 122 (e.g., a WLAN transmitter), a receiver (RX) 124 (e.g., a WLAN receiver), a communications interface 126, one or more antenna 130, a memory device 134, one or more input/output (I/O) devices 128, and a processor 140. These components may all be coupled to a communications bus 148. The memory device 134 may include storage in which to store the supervised ML model 158, e.g., a SVM or a NN model, the WLAN sensing mobile application 178, or other software components that can perform some of the operations described herein.

In one embodiment, the receiver 124 receives first data indicative of channel properties of a first communication link between the wireless device 120 and a wireless transmitter 122 in access point device, both of which are located in a building. In one embodiment, the processor 140 may be configured to direct the TX 122 to transmit the first data, which includes the channel properties, to a remote computing device (e.g., the computing device 150) over the network 115 for supervised ML processing. The processor 140 may further be configured to perform pre-processing of the first data and to classify the pre-processed first data as detecting either a stationary object (e.g., which may be known already to be stationary) or detecting a moving object such as a human, as described herein. In various embodiments, the I/O devices 218 may include an input device such as a microphone, and an output device such as a speaker.

The antennas (such as the antenna 130) described herein within various devices may be used for Long Term Evolution (LTE) frequency bands, third generation (3G) frequency bands, Wi-Fi® and Bluetooth® frequency bands or other WLAN frequency bands, including Zigbee®, Z-wave™ or the like, wide area network (WAN) frequency bands, global navigation satellite system (GNSS) frequency bands such as global positioning system (GPS) frequency bands, or the like.

As illustrated in FIG. 1C, the communications interface 126 may further include RF circuitry 142, a set of RF modules 144, and a baseband channel estimator 146. In one embodiment, one of the RF modules 144 may include a WiFi® PHY at which the RF energy of received RF signals may be measured for purposes of RSSI. The baseband channel estimator 146, by virtue of being incorporated within the communications interface 126, may be coupled to the antenna 130, the TX 122, and to the RX 124, and be adapted to estimate the CSI (or the RSSI) for each channel. As discussed, the CSI includes a detailed channel impulse response (e.g., containing channel properties) with both amplitude and phase information across all the OFDM subcarriers and is updated (at the maximum rate) every OFDM symbol. This provides more information about the environment under surveillance, and thus provides excellent detection capability when applying a supervised ML model to CSI data.

The wireless device 120 may, in various embodiments, continuously upload RSSI or CSI data to the computing device 150 (FIG. 1) for use in device placement processing and/or supervised ML model processing, or may buffer the RSSI or CSI data in the memory 134 (or other computer storage) and then periodically upload the RSSI or CSI data at a predetermined time interval. This data may allow the computing device 150 to perform updates to training of the supervised ML model 158. In one embodiment, the wireless device 120 (or a co-located computing system) is adapted to include sufficient memory, storage, and processor power to be able to directly perform pre-processing and classification with the supervised ML model 158 discussed herein.

In some embodiments, the wireless device 120 (or co-located computing system) may contain sufficient processing power to perform updates to training of the supervised ML model 158, and thus may work independently of access to cloud-based resources. These updates may be made using newly received data containing channel properties that confirm or fail to confirm the accuracy of the pre-trained classifiers 162, which are trained as a part of the supervised ML model 158.

Referring back to FIG. 1B, once the devices are placed in the setup mode, the WLAN sensing mobile application 178 can perform various operations to collect CSI data in the setup mode as described below with respect to FIG. 2.

Figure 2:
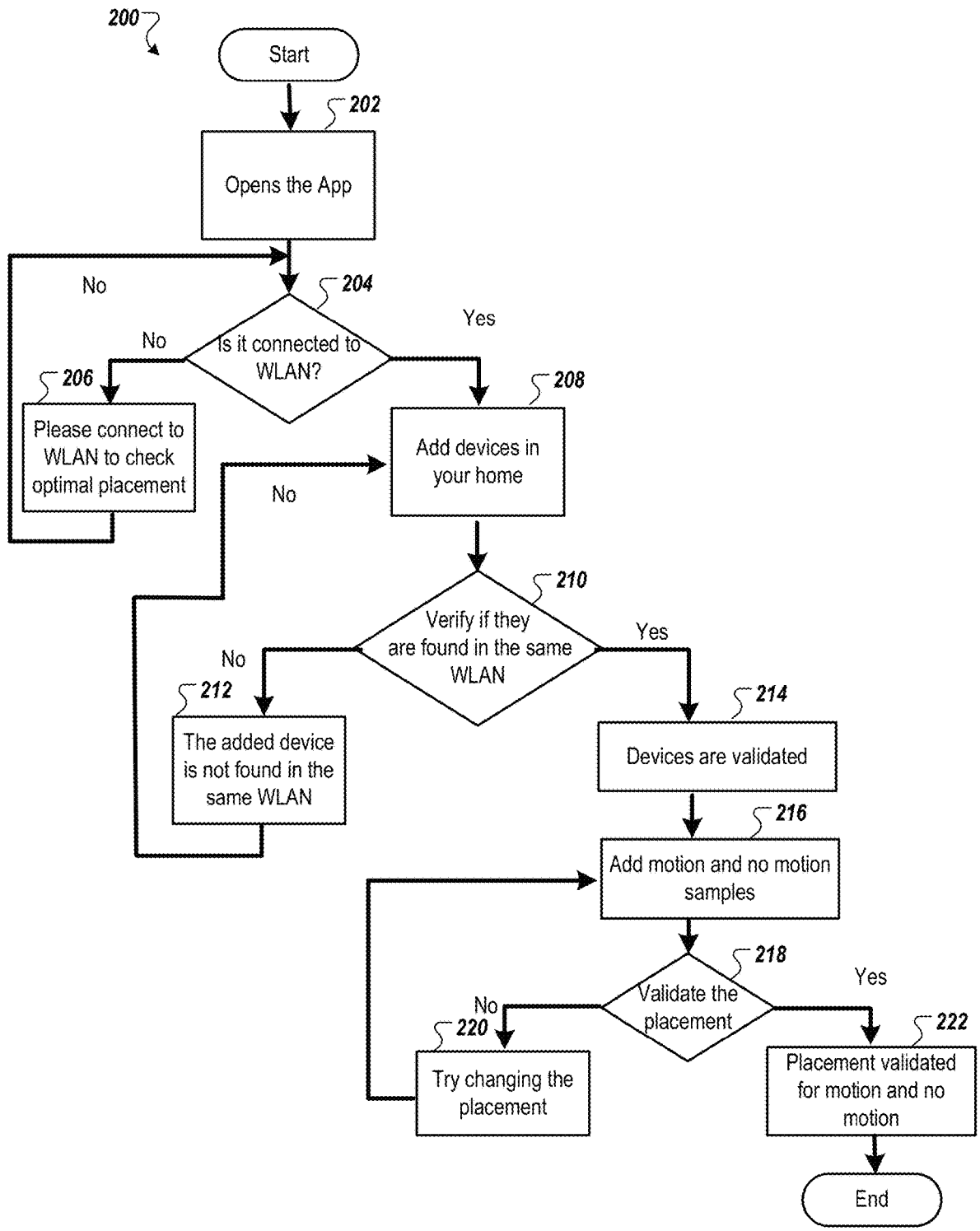
FIG. 2 is a flow diagram of a method of collecting motion samples and no-motion samples to validate placement of devices in a wireless local area network (WLAN), according to at least one embodiment.

FIG. 2 is a flow diagram of a method 200 of collecting motion samples and no-motion samples to validate placement of devices in a WLAN, according to at least one embodiment. The method 200 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, of the computing device 150, or of the wireless device 120 performs the method 200. Alternatively, other components of a disclosed device may perform some or all of the operations of the method 200.

With further reference to FIG. 2, the method 200 may begin with the processing logic receiving a request to open the WLAN sensing mobile application (block 202). The processing logic determines whether the wireless device executing the WLAN sensing mobile application is connected to a WLAN (block 204). If the wireless device is not connected to the WLAN, the processing logic prompts the user to connect to the WLAN to check optimal device placement (block 206) and returns to continue checking whether it is connected to the WLAN at block 204. If the wireless device is connected to the WLAN at block 204, the processing logic prompts the user to add devices in a home or building (block 208). The processing logic verifies if the added device is found in the same WLAN (block 210). If the processing logic determines that the added device is not found in the same WLAN, the processing logic prompts the user that the added device is not found in the same WLAN (block 212) and returns to block 208. If the processing logic determines that the added device is found in the same WLAN at block 212, the processing logic prompts the user that the added device is validated (block 214) and initiates collection of CSI data and motion samples and no-motion samples (block 216) and proceeds to validate the placement of the added devices (block 218). Additional details of the placement validation are described below. If the placement of an added device is not validated, the processing logic can prompt the user to change the placement of the added device (block 220), and returns to block 216 to collect additional data with the added device at a new location. If the processing logic validates the placement of the added device at block 218, the processing logic can prompt the user that the placement has been validated for motion and no-motion detection (block 222), and the method 200 ends.

In at least one embodiment, the processing logic returns to block 208 to add additional devices. In another embodiment, multiple devices are added at block 208, and the processing logic can validate each of the devices as being found in the WLAN at block 210 and validate the placement of the added devices at block 218.

In at least one embodiment, the processing logic at block 218 uses the CSI pattern analyzer 174 to validate the placement of an added device.

Referring back to FIG. 1B, the CSI pattern analyzer 174 can perform three levels of analysis on the collected data. The three levels of analysis can include link quality analysis, numerical analysis, and machine learning based analysis to validate the placement of an added device. Depending on the number of devices and deployment, part of the CSI processing and analysis can be done on the wireless device and data can be uploaded to the computing device 150 for more involved tasks.

In at least one embodiment, the CSI pattern analyzer 174 performs a first-level analysis to assess a link quality and eliminate network-level issues. Once the devices are placed at desired positions, an initial check on the basic functionality of exchanging the CSI packets is done in a first stage. Checking if the CSI packets are being exchanged at expected timeslots; received signal strength, congestion metrics, co-existence mode, and other network parameters are analyzed to assess the quality of the link. If there is a fundamental network issue, the user is guided to change the placement of the device; otherwise, if there are not network issues, the CSI values are sent to a next stage for numerical analysis.

In at least one embodiment, the CSI pattern analyzer 174 performs a second-level analysis to perform numerical analysis on the CSI data. Once the network level issues are eliminated in the earlier stage, numerical analysis is done on the filtered CSI values to understand mean, variance across time and subcarriers, trend of the Fast Fourier Transform (FFT) output values. These are compared against the min/max thresholds defined for motion and no-motion. If the values fall under the previously defined limits, the device can be validated for no-motion and motion. In case of not enough confidence, the CSI values are sent to the next stage of Machine Learning based analysis. Details of the metrics are described below with respect to FIGS. 6A-8E.

In at least one embodiment, the CSI pattern analyzer 174 performs a third-level analysis to analyze and correlate patterns in the CSI data. In the third-level analysis, dimensionality reduction and clustering techniques, like UMAP, TSNE, are used to analyze and correlate the CSI FFT output patterns. If the patterns match with previous data with confidence more than a threshold, then the placement will be validated accordingly. If there is no proper match with the larger pool of CSI dataset already available, there will be a request for local training to improve the accuracy of prediction. In both above cases, the CSI values are added to existing dataset.

Referring back to FIG. 2, the processing logic at block 218 can use the one or more of the three levels of analysis to validate the placement of the added device, such as illustrated and described below with respect to FIGS. 3A-3C and FIG. 4A-4B.

Figure 3A:
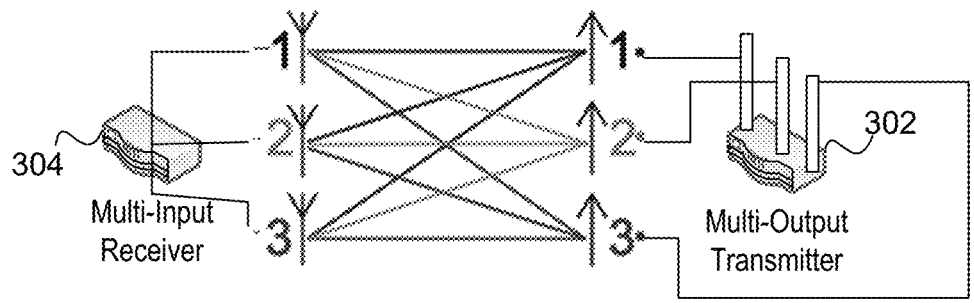
FIG. 3A is a block diagram of a multi-input receiver and a multi-output transmitter in communication, according to one embodiment.

FIG. 3A is a block diagram of a multi-input receiver 304 and a multi-output transmitter 302 in communication, according to one embodiment, to represent how CSI operates. The standard Institute for Electrical and Electronics Engineers (IEEE) 802.11n was established in 2007 to boost the range and throughput of WiFi® service. In IEEE 802.11n, multiple-in, multiple-out (MIMO) OFDM is used and the physical layer presents a value to estimate the channel status in each subcarrier, e.g., the CSI for each subcarrier. The CSI may therefore be expressed as:

$$H = \begin{bmatrix} h_{11} & h_{12} & \ldots & h_{1N_r} \\ h_{21} & h_{22} & \vdots & h_{2N_r} \\ \vdots & \vdots & \vdots & \vdots \\ h_{N_t 1} & h_{N_t 2} & \vdots & h_{N_t N_r} \end{bmatrix} \quad (1)$$

where $$H(f_k) = |H(f_k)| e^{j \angle H(f_k)} \quad (2)$$

The term $H(f_k)$ represents the CSI value at the subcarrier level with frequency $f_k$. $|H(f_k)|$ denotes the amplitude and $\angle H(f_k)$ the phase in the subcarrier. The CSI describes how a signal propagates between the transmitter and the receiver device in both amplitude and phase. The CSI also reveals the combined effect of scattering, fading, and power decay with respect to a distance of the received signals.

Figure 3B:
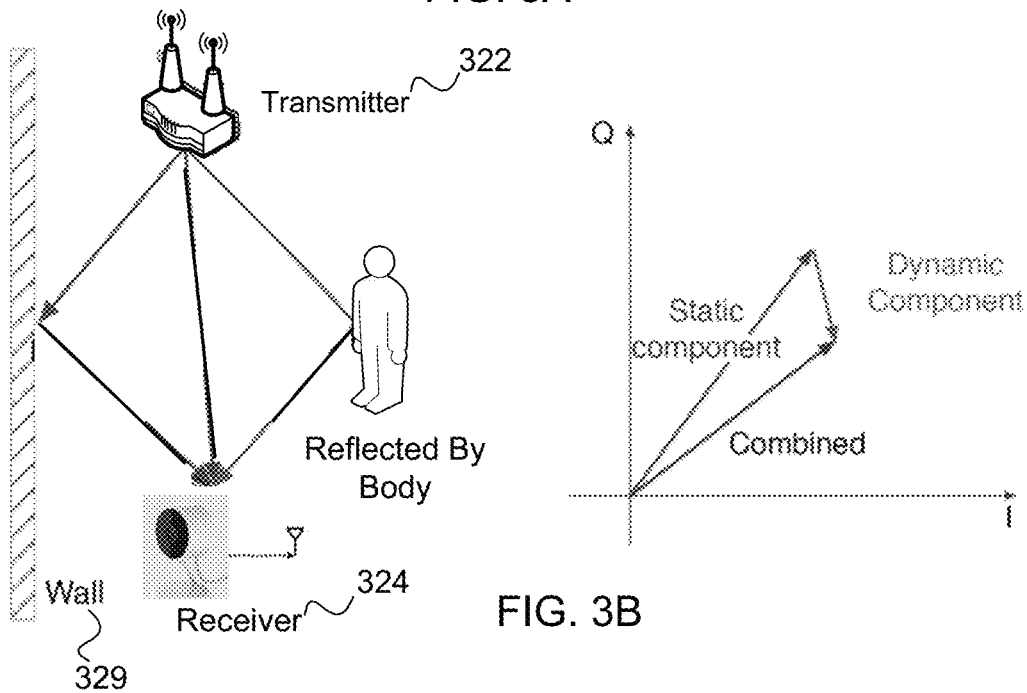
FIG. 3B is a reflection diagram of wireless signals between a transmitter and a receiver with a stationary human in a room, according to one embodiment.
Figure 3C:
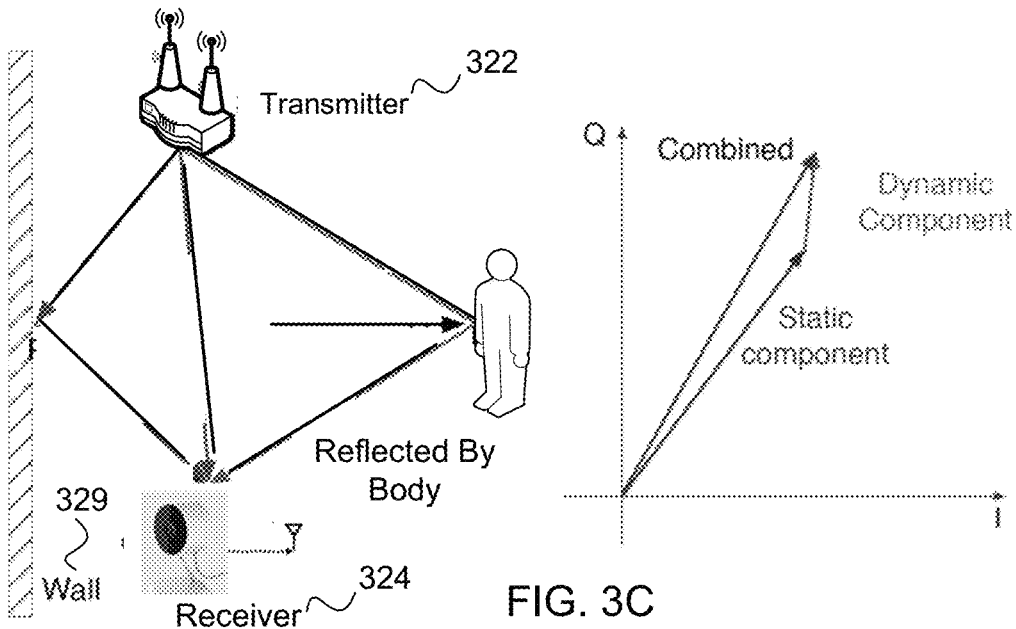
FIG. 3C is a reflection diagram of wireless signals between transmitter and receiver with a moving human in the room, according to one embodiment.

FIG. 3B is a reflection diagram of wireless signals between a transmitter 352 and a receiver 304 with a stationary human, according to one embodiment. FIG. 3C is a reflection diagram of wireless signals between the transmitter 322 and the receiver 324 with a moving human (e.g., $d_k(t)$), according to one embodiment. In one example, the transmitter 322 may be the multi-output transmitter 302 (e.g., a second wireless device) and the receiver 342 may be the multi-input receiver 304 (e.g., a first wireless device).

The transmitter 322 may transmit in many directions, including a line of sight (LoS) path as well as paths that reflect off of objections, such as a wall 329. Signal propagation may also be disturbed by human motion, and different motion activity may return different characteristics in the CSI data. In this way, machine learning may be used to classify the presence of the human. Equation (1) may depict the CSI data within a static channel, e.g., within a communication link that includes no human movement. Equation (2) may detect the CSI data within a combination of a static channel and dynamic channel, where a portion of the CSI data indicates human movement.$_k$ $$H(f, t) = e^{-j2\pi\Delta ft} = \sum_{k=1}^{N} ak(f, t) e^{-j2\pi f \tau_K(t)} \quad (1)$$

$$H(f, t) = e^{-j2\pi\Delta ft} \left( H_s(f) + \sum_{k \in Pd} a_k(f, t) e^{-j\frac{2\pi d_k(t)}{\lambda}} \right) \quad (2)$$

where $H_s(f)$ in Equation (2) is the static channel component.

Figure 4A:
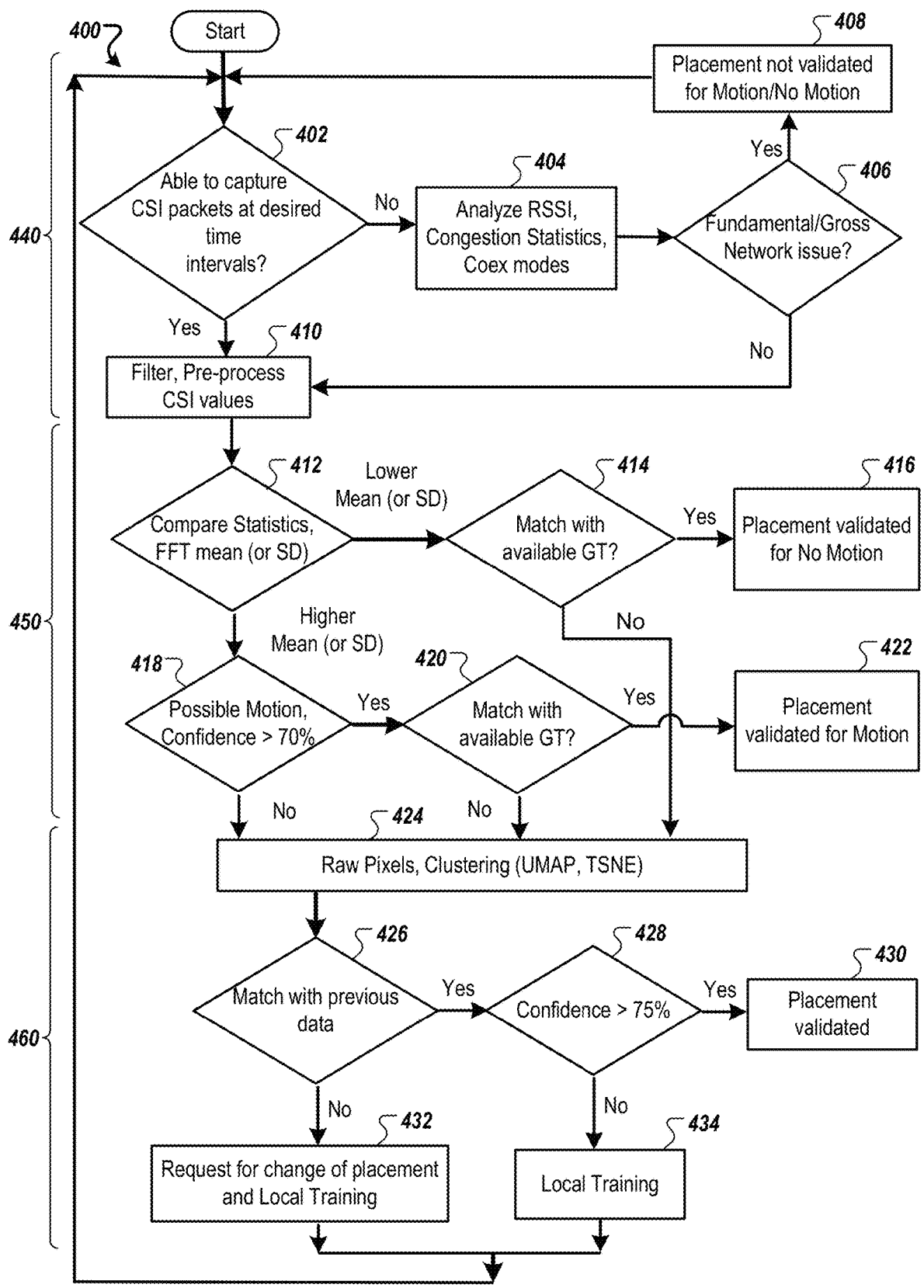
FIG. 4A is a flow diagram of a method of processing CSI to validate placement of a device in a WLAN for optimal performance, according to at least one embodiment.

FIG. 4A is a flow diagram of a method 400 of processing CSI to validate placement of a device in a WLAN for optimal performance, according to at least one embodiment. The method 400 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, of the computing device 150, or of the wireless device 120 performs the method 400. Alternatively, other components of a disclosed device may perform some or all of the operations of the method 400.

With further reference to FIG. 4A, the method 400 may begin with the processing logic determining whether the device CSI collector 172 is able to capture CSI packets as expected (block 402). The processing logic can determine whether the CSI packets are being received at regular time intervals or the CSI packets have a size that is greater than a specified threshold. For example, a threshold can be used that represents the predetermined time interval and the processing logic can determine if the CSI packets are received in time intervals that are less than the threshold. The processing logic can determine if it is receiving enough CSI packets to ensure a good link quality for analyzing CSI data. In another embodiment, the processing logic can determine a size of the CSI packet. If the size is above a threshold size, the processing logic can determine that the CSI packet has useful information and there is not a network issue. If the CSI packets are not captured at the desired time intervals at block 402, the processing logic analyzes RSSI data, airtime utilization data, congestion statistic data, coexistence mode data, and/or other network parameters, such as transmission metrics (e.g., airtime utilization data, congestion statistic data, or the like) to assess whether the link has network issues that will prevent further processing of the CSI data (block 404). In at least one embodiment, the processing logic identifies a network issue with the wireless channel using at least one of second CSI data, RSSI data, airtime utilization data, or congestion statistic data. If there are network issues the CSI data cannot be used to validate the placements. The network issues may be indicative of poor device placement. In some cases, the network issues may alert the user to other issues that are unrelated to device placement. The processing logic can assess traffic patterns, how many devices are connected in a network, whether there is packet loss caused by coexistence issues (e.g., devices in a personal area network (PAN) are operating in proximity to the devices in the WLAN), or the like. The processing logic can use these transmission metrics to determine whether there is a fundamental network issue that affects the receipt of CSI data. In particular, the processing logic determines whether there is a fundamental network issue (block 406) based on the transmission metrics analyzed at block 404. If there is a fundamental network issue at block 406, the processing logic determines that the placement is not validated for motion and no-motion detection (block 408). The processing logic can prompt the user that there is a fundamental network issue detected. The processing logic returns to block 402.

However, if the device CSI collector 172 is able to capture CSI packets at desired time intervals at block 402, the processing logic filters and pre-processes the CSI values in the CSI packets (block 410) (also referred to as CSI samples). In at least one embodiment, the filter and pre-processing can be done on the device when collected. In another embodiment, the device can send the raw data to the cloud system and the cloud system can filter and pre-process the raw data. In at least one embodiment, the processing logic can filter the CSI samples so that only some of the CSI samples are sent to the cloud system. In another embodiment, the processing logic can normalize the CSI samples. In at least one embodiment, the processing logic can perform some time-domain filtering to remove noise in the CSI samples. In at least one embodiment, the processing logic applies a hamming filter to filter out CSI samples with a high variance. In at least one embodiment, some CSI values are missing and the processing logic can interpolate to obtain the CSI values.

In at least one embodiment, the processing logic computes one or more statistical parameter values over a time period. The statistical parameter values can include a maximum value, a minimum value, a mean value, a variance value, a standard deviation value, an entropy value, a mean cross rate value, a skewness value, a kurtosis value, or the like. In at least one embodiment, the device CSI collector 172 (or the CSI pattern analyzer 174) computes three statistical values in evaluating a sequence of CSI samples, including an average (mean) value, a variance value, and a standard deviation (SD) value. The average value represents a constant level of the samples. The average value can specify the average, or constant value, of a signal. The variance value indicates the magnitude of the fluctuations about the average value. The variance value can represent the magnitude squared, or power, of the fluctuating component of the signal. The SD value is an indication of the magnitude of the fluctuating component of the signal. In at least one embodiment, the device CSI collector 172 (or the CSI pattern analyzer 174) computes a FFT of the CSI data over time and across OFDM subcarriers. In another embodiment, the processing logic computes statistics of the FFT outputs as well, such as the FFT mean, variance, SD, or the like. In at least one embodiment, the device CSI collector 172 can compute an image (e.g., two-dimensional matrix of values) representing the channel that can be used to classify as motion or no motion detections. The device CSI collector 172 (or the CSI pattern analyzer 174) can compute statistical values of the FFT data, such as the FFT mean values, the FFT variance value, and the FFT standard deviation values.

In at least one embodiment, the operations at blocks 402-410 are performed as part of the first-level analysis 440 to assess the link quality. Once any network level issues are eliminated in the first-level analysis 440, the processing logic proceeds to the second-level analysis 450, starting at block 414, to assess the quality of the CSI data for classifications.

In general, the CSI data for a channel is not expected to change when there is no motion or presence to disrupt the channel. If a person is present or moves between the transmitter and receiver, the CSI data for the channel is expected to change. The processing logic can compute the FFT of the CSI data to analyze the frequency components. The CSI data after FFT can show signal patterns for certain subcarrier indexes that represent different feature extractions that can represent presence and motion or non-motion of a person in a location with the transmitter and receiver. For example, the feature extractions can represent the presence of a person, whether the person is walking slowing, walking, slowly moving while sitting, and other features. frequency domain When there is no motion between the transmitter and receiver, there may be a direct current (DC) component in the FFT values and lower values or zero values in the other frequency components. In contrast, when there is motion between the transmitter and receiver, there may be spikes in the frequency components where the motion impacts the channel. The FFT values can help classify when there is no motion and when there is motion. In at least one embodiment, the processing logic compares the statistical parameter values with expected values or thresholds for motion and no motion (block 412). For example, the processing logic can compare the current FFT values against an FFT mean or the current SD against a SD threshold. Similarly, the processing logic can compare the current variance against a threshold variance. In at least one embodiment, if the FFT value is less than the FFT mean (or SD), the processing logic determines whether there is a match with an available ground truth (GT) table (block 414). If there is a match, the processing logic can validate the placement for no-motion detection (block 416). In at least one embodiment, the processing logic returns to block 402 to capture CSI packets when there is motion to validate the placement for motion detection. In at least one embodiment, if the FFT value is greater than the FFT mean (or SD), the processing logic determines whether there possible motion with a confidence score that is greater than a specified threshold (e.g., 70%) (block 418). If the confidence score is greater than the specified threshold at block 418, the processing logic determines whether there is a match with the available GT table (block 420). If there is a match, the processing logic can validate the placement for motion detection (block 422). In at least one embodiment, the GT table is a decision mapping table, such as illustrated in FIG. 4B. In at least one embodiment, the processing logic returns to block 402 to capture CSI packets when there is no-motion to validate the placement for motion detection. In at least one embodiment, the processing logic performs the numerical analysis as a check that uses less computational resources than ML classifications in a machine learning based analysis.

If the possible motion is less than the specified value at block 418, or there is no match with the available GT table at block 414 or block 420, the processing logic proceeds to the third-level analysis 460, starting at block 424, to perform machine learning based analysis to validate the placement of devices. In at least one embodiment, the operations at blocks 410-422 are performed as part of the second-level analysis 450 to assess the link quality.

In at least one embodiment, in the third-level analysis 460, the processing logic can analyze raw pixels of the CSI image generated in the previous operation, perform dimensionality reduction and clustering techniques, like UMAP, TSNE, to analyze and correlate the CSI FFT output patterns (block 424). In at least one embodiment, the clustering can be performed in an iterative manner, such as described below with respect to FIG. 5. The processing logic determines whether the current data matches previous data (block 425). If there is a match, the processing logic determine if the match has a confidence score that is greater than a specified threshold (e.g., 75%) (block 428). If the confidence score is greater than the specified threshold, the processing logic can validate the placement for motion and no-motion detection (block 430). If the current data does not match the previous data at block 426, the processing logic can prompt the user to change placement of the device and perform local training again (block 432), and return to block 402. If the confidence score is not greater than the specified threshold at block 428, the processing logic can perform additional local training of the ML model for the local conditions (block 434), and return to block 402.

In at least one embodiment, the processing logic can perform local training at block 434 by receiving the CSI stream and performing interpolation and infinite impulse response (IIR) filtering on the CSI stream. The processing logic can compute one or more statistical parameter values and the FFT of the CSI values. The processing logic can compute statistical parameter values on the FFT results as well. For example, the processing logic can compute the variance, the mean, the cross rate, and entropy of the results of the interpolation and IIR filtering. The processing logic can also compute the variance, the mean, the cross rate, and entropy of the results of the FFT. The processing logic can label the training data set accordingly. The processing logic can receive user feedback to help with labeling the training data set. The training data set can be used to train the ML model used in the classification stage. At block 434, the processing logic can perform these operations as additional training to fine-tune an existing ML model.

In the classification stage, the processing logic receives the CSI stream and performs interpolation and IIR filtering on the CSI stream. The processing logic can compute one or more statistical parameter values and the FFT of the CSI values. The processing logic can compute statistical parameter values on the FFT results as well. For example, the processing logic can compute the variance, the mean, the cross rate, and entropy of the results of the interpolation and IIR filtering. The processing logic can also compute the variance, the mean, the cross rate, and entropy of the results of the FFT. The processing logic can generate the testing data set that is input into the trained ML model to detect presence, motion, no-motion, or the like. The classification in the classification stage can also receive user feedback to improve performance of the trained ML model.

FIG. 4B is a decision mapping table 480 to indicate disclosed solutions to the possibility of false-positive or false-negative motion detections, according to various embodiments. Note that the decision mapping table 480 is set up with decision results along columns and the ground truth in the first column. As expected with detection using wireless signals, motion is detected with high confidence in true negative (TN) and true positive (TP) scenarios. Note, however, that false positives (FP) and false negatives (FP) are to be reduced to increase detection confidence in these scenarios.

False positive (FP) detection may be reduced via the employment of wireless detection (e.g., with the use of WiFi® technology to capture CSI or CSI-like data) combined. Furthermore, false negatives (FP) may be reduced by analyzing a few samples over a longer time window, instead of relying on a decision for each sample. In other words, when a plurality of decisions within that time window exceed a determined threshold number of decisions, the disclosed wireless detector or system may trigger an action based on confirmed motion (e.g., trigger a light switch, a thermostat, or signal a security system).

In another embodiment, the decision mapping table 480 can include additional rows for motion, no-motion, or other features.

Figure 5:
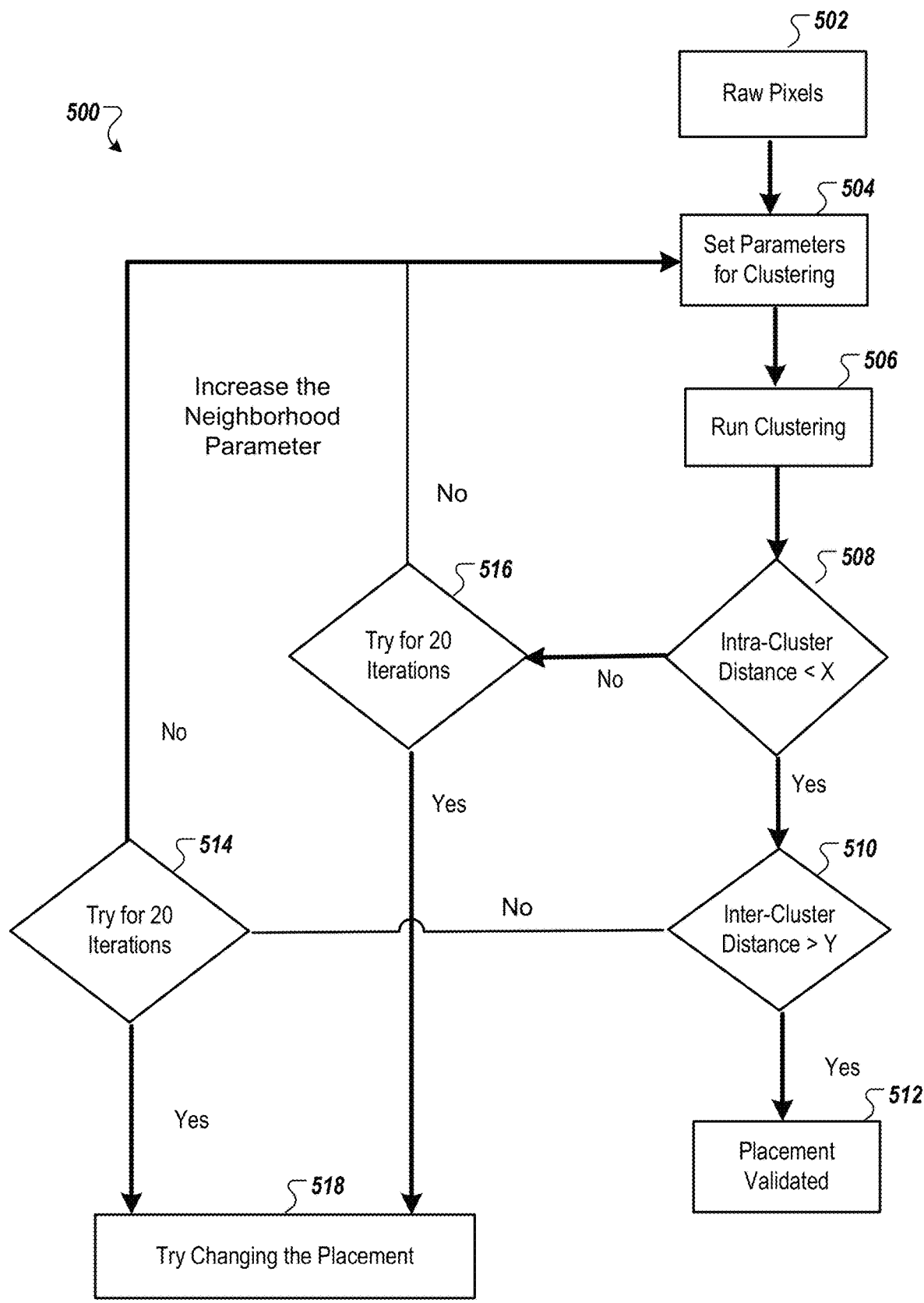
FIG. 5 is a flow diagram of a method of a machine learning based analysis to validate placement of a device in a WLAN for optimal performance, according to at least one embodiment.

FIG. 5 is a flow diagram of a method 500 of a machine learning based analysis to validate placement of a device in a WLAN for optimal performance, according to at least one embodiment. The method 500 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, of the computing device 150, or of the wireless device 120 performs the method 500. Alternatively, other components of a disclosed device may perform some or all of the operations of the method 500.

With further reference to FIG. 5, the method 500 may begin with the processing logic obtaining raw pixels (block 502) and setting a set of parameters for clustering (block 504). The processing logic performs the clustering (block 506) and determines whether there is a clustering convergence by determining if an intra-cluster distance value is less than a specified threshold, X (block 508). The specified threshold, X, can represent a proximity or separation of samples within a cluster used for feature extraction, such as what does a motion feature or a no-motion feature. When there is a clustering convergence at block 508, the processing logic determines if an inter-cluster distance value corresponding to the clustering convergence is greater than a specified threshold, Y (e.g., 0.5). The specified threshold, Y can represent a separation between two clusters. If the inter-cluster distance is less than the specified threshold at block 510, the processing logic can validate the placement for motion and no-motion detection (block 512). If there is no clustering convergence at block 508, the processing logic can increase the parameters for clustering and redo the clustering at block 506 with the increased number of parameters over a specified number of iterations. At block 516, the processing logic can determine whether it is has tried the specified number of iterations (e.g., 20 iterations). If so, the processing logic can prompt the user to change the placement (bock 518); otherwise, the processing logic increases the number of parameters and returns to block 504. If the inter-cluster distance is greater than the specified threshold at block 510, the processing logic can also increase the parameters for clustering and redo the clustering at block 506 with the increased number of parameters over a specified number of iterations (e.g., 20 iterations). At block 514, the processing logic can determine whether it has tried the specified number of iterations (e.g., 20 iterations). If so, the processing logic can prompt the user to change the placement (bock 518); otherwise, the processing logic increases the number of parameters and returns to block 504.

Figure 6:
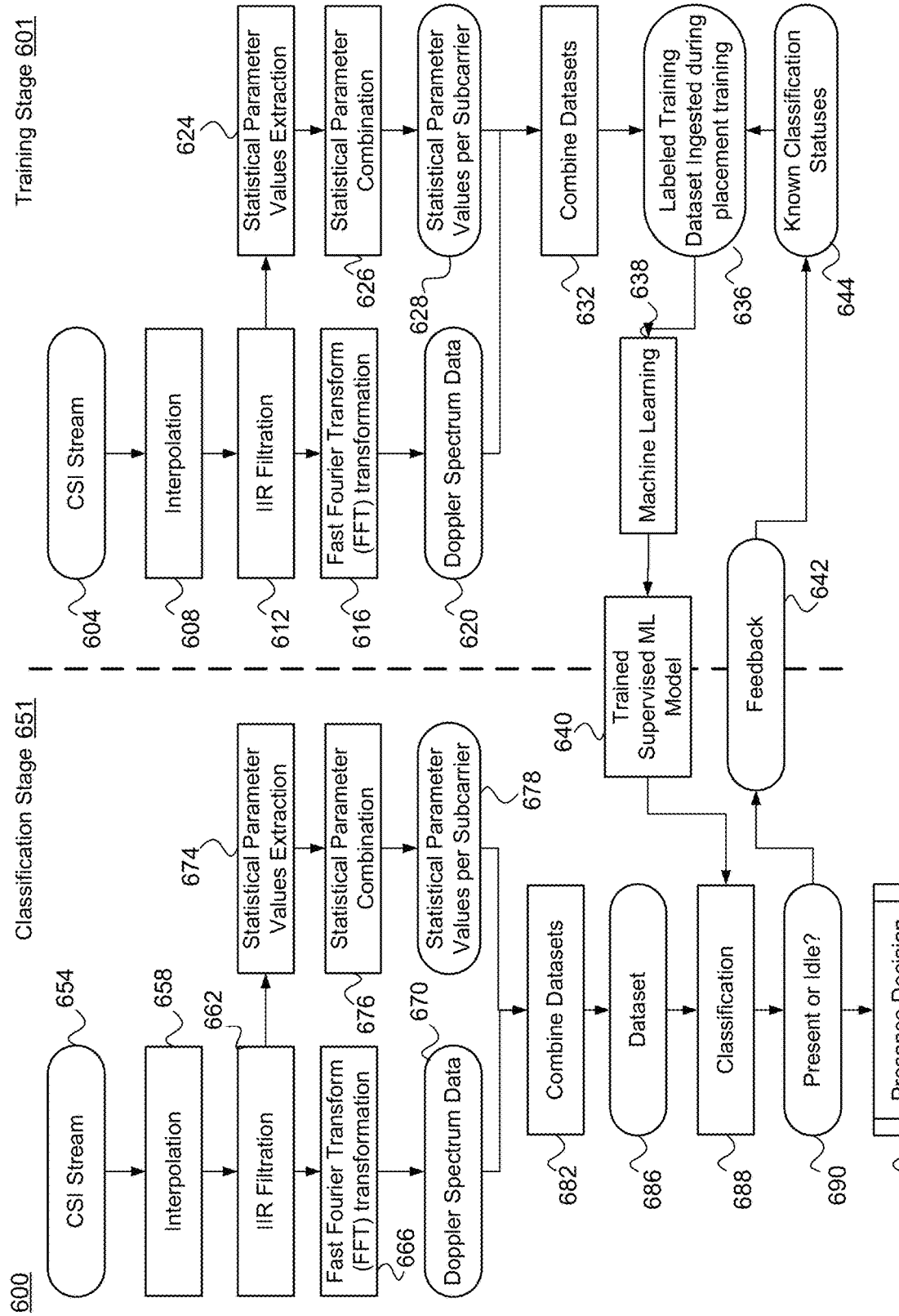
FIG. 6 is a flow diagram of a method including a training stage and a classification stage to, respectively, train a supervised machine learning (ML) model and to apply the trained ML model to classify pre-processed data to perform presence detection, according to various embodiments.

FIG. 6 is a flow diagram of a method 600 including a training stage 601 and a classification stage 651 to, respectively, train a supervised machine learning (ML) model and to apply the trained ML model to classify pre-processed data to perform presence detection, according to various embodiments. Method 600 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, of the computing device 150, or of the wireless device 120 performs the method 600. Alternatively, other components of a disclosed device may perform some or all of the operations of the method 600.

With further reference to FIG. 6, the method 600 may begin with the processing logic, within the training stage 601, receiving initial data indicative of channel properties of a communication link between a wireless receiver (e.g., in the wireless detector 104) and a wireless transmitter (e.g., in the AP device 110) (block 604). In one embodiment, the initial data is a CSI stream, but RSSI data may also be included. The initial data may be captured from a room within a building during an initial training phase used to train the supervised ML model 158 before employing the supervised ML model for presence and motion detections.

The method 600 may continue with the processing logic performing interpolation of the initial data to obtain interpolated data (block 608). The interpolated data may include equidistant data points that embody the channel properties, e.g., to provide a smoothing affect to the initial data, e.g., CSI data. The method 600 may continue with the processing logic filtering the interpolated data with an IIR filter to generate filtered data having reduced noise compared to the interpolated data (block 612). Such an IIR filter may include feedback from an output of the IIR filter, and which may therefore be known as a recursive digital filter. The filtering performed by the IIR filter may further include a non-linear phase characteristic. In other embodiments, another type of filter may be used. The interpolation and the filtering at blocks 608 and 612 may be performed to generate pre-processed data, and additional pre-processing steps are envisioned.

Given a complex-numbered CSI stream $h(k, t_n)$ for $k_{th}$ subcarrier index sampled at time $t_n$, the magnitude of $h(k, t_n)$ over time period T has N samples and can construct an $N_{sc} \times N$ matrix H.

$$H = \begin{bmatrix} |h(1, t_1)| & \cdots & |h(1, t_N)| \\ \vdots & \ddots & \vdots \\ |h(N_{sc}, t_1)| & \cdots & |h(N_{sc}, t_N)| \end{bmatrix} \quad (3)$$

The matrix, H, of Equation (3) may include the interpolated and filtered data spanning various data points over time for the $k_{th}$ subcarrier index.

With continued reference to FIG. 6, the method 600 may continue with the processing logic executing a FFT on the pre-processed data to generate a data stream in the frequency domain, e.g., that contains frequency domain information of the pre-processed data (block 616). The fast FFT is a discrete Fourier transform algorithm that reduces the number of computations needed for N points from $2N^2$ to $2N\lg N$, where lg is the base-2 logarithm. In one embodiment, a one-dimensional FFT with Nm points may be applied to each row of the matrix of Equation (3) to result in the following Doppler spectrum matrix, $H_{freq}$, given as Equation (4).

$$H_{freq} = \begin{bmatrix} |\tilde{h}(1, f_0)| & \cdots & |\tilde{h}(1, f_{N_{fft}-1})| \\ \vdots & \ddots & \vdots \\ |\tilde{h}(N_{sc}, f_0)| & \cdots & |\tilde{h}(N_{sc}, f_{N_{fft}-1})| \end{bmatrix} \quad (4)$$

where $\tilde{h}(k, f_n)$ is the $n_{th}$ frequency component for $k_{th}$ subcarrier index after FFT.

The data within the Doppler spectrum matrix may therefore be indicative of shifts in incoming received waves over a multipath channel. These shifts in turn indicate movement of an object (e.g., a human) across time and space. For example, the $n^{th}$ reflected wave with amplitude ($c_n$) and phase ($\phi_n$) arrive from an angle ($a_n$) relative to the direction of movement of the human. The Doppler shift of this wave may be expressed as:

$$\Delta f_n = \frac{v}{\lambda} \cos \alpha_n \quad (7)$$

where v is the speed of the human that is moving. The data points within the Doppler spectrum matrix may therefore include the information for determining human presence based on reflected wireless signals from a moving human.

The method 600 may continue with the processing logic extracting frequency components from the data stream in the frequency domain, e.g., the Doppler spectrum matrix, $H_{freq}$, which are indicative of movement of a human, to generate Doppler spectrum data (block 620). For example, in one embodiment, the frequency components of DC and above 30 Hz may be dropped out to reduce the size of an input feature vector (discussed below) as only motion is useful info for classification. Then the matrix values may be stacked into a one-dimensional vector as illustrated in Equation (5).

$$Y_{freq}=[|H(1,f_1)| \ldots |h(1,f_{30\ Hz})| \ldots |h(N_{sc},f_1)| \ldots |h(N_{sc},f_{N_{fft}})|] \quad (5)$$

Additional reference will be made to this one-dimensional vector later.

With continued reference to FIG. 6, the method 600 may continue with the processing logic extracting, from the filtered data for the subcarrier, statistical parameter values over a time period and within the time domain (block 624). The statistical parameter values may include one or more of a maximum value, a minimum value, a mean value, a variance value, an entropy value, a mean cross rate value, a skewness value, or a kurtosis value, each of which is defined in more detail below. The method 600 may continue with the processing logic combining these statistical parameter values into a second one-dimensional vector (block 626), to generate a combined vector of the statistical parameter values for each subcarrier (block 628). In another embodiment, the method 600 generates statistical parameter values of the FFT results at block 616 or block 620.

The statistical parameter values may be useable as feature values to define the supervised ML model 158, particularly in the case of an SVM model. More specifically, by combining the time-domain-based statistical parameter values as features, a machine learning classifier may separate new testing data in a hyper-dimensional plane with more accuracy. If the regularization technique is utilized to generate a SVM machine learning model, the contribution or weighting of these features may be emphasized or de-emphasized with hyper-parameters (e.g., statistical parameters per hyperplane for each subcarrier) to avoid the overfitting in the optimization process upon application of the supervised ML model 158. Similarly, by combining the frequency-domain-based statistical parameter values as features, the machine learning classifier can separate new testing data in a hyperdimensional plane with more accuracy.

In various embodiments, the maximum and minimum values per subcarrier may be the maximum and minimum value of magnitude of complex CSI $h(k, t_n)$ over time period T. The mean value of $h(k, t_n)$ per subcarrier over time period T may be defined as Equation (6):

$$\mu(k) = \frac{1}{N}\sum_{t_n \in T}|h(k, t_n)| \quad (7)$$

In one embodiment, the variance value per subcarrier may be defined as $$\text{var}(k) = \frac{1}{N-1}\sum_{N}[|h(k, t_n)| - \mu]^2 \quad (8)$$

where there are N samples for the time period T.

The magnitude of $h(k, t_n)$ over time period T may have N samples and can construct a $N_{sc} \times N$ matrix H like a two-dimensional image, given in Equation (9).

$$H = \begin{bmatrix} |h(1, t_1)| & \ldots & |h(1, t_N)| \\ \vdots & \ddots & \vdots \\ |h(N_{sc}, t_1)| & \ldots & |h(N_{sc}, t_N)| \end{bmatrix} \quad (9)$$

From the matrix, H, the processing logic may remove the stationary objects within the scene through the subtraction of the mean of sampled time period ($H_{mean}$) and normalize the data to a grayscale image (all entries are between 0 and 1) $I_{gray}$.

In one embodiment, the processing logic CSI entropy value may be computed with the formula of the image entropy $$\text{Entropy} = -\sum_{All(m,n)} I_{gray}(m, n) * \log_2(I_{gray}(m, n)) \quad (10)$$

where (m, n) is the entry of $m_{th}$ row and $n_{th}$ column of gray scale image. Mean cross rate value per subcarrier may count the number of crossings (in the positive direction) of $h(k, t_n)$ through the mean valued μ for the specified time period, T.

Skewness is a measure of the asymmetry of the data around the sample mean. If skewness is negative, the data are spread out more to the left of the mean than to the right. If skewness is positive, the data are spread out more to the right. The skewness value of the normal distribution (or any perfectly symmetric distribution) is zero.

In one embodiment, therefore, the skewness feature per subcarrier may be defined as expressed in Equation (11).

$$s(k) = \frac{\frac{1}{N}\sum_{N}[|h(k, t_n)| - \mu]^3}{\left\{\sqrt{\frac{1}{N}\sum_{N}[|h(k, t_n)| - \mu]^2}\right\}} \quad (11)$$

Kurtosis is a measure of how outlier-prone a distribution is of a dataset. The kurtosis value of the normal distribution is three. Distributions that are more outlier-prone than the normal distribution have a kurtosis value greater than three, e.g., distributions that are less outlier-prone have kurtosis values less than three. Kurtosis may be expressed by the following Equation (12).

$$Kr(k) = \frac{\frac{1}{N}\sum_{N}[|h(k, t_n)| - \mu]^4}{\left\{\sqrt{\frac{1}{N}\sum_{N}[|h(k, t_n)| - \mu]^2}\right\}^2} \quad (12)$$

With continued reference to FIG. 6, the method 600 may continue with the processing logic combining (e.g., stacking) the feature values (within the second vector) with the Doppler spectrum data (within the first vector) within a one-dimensional (1D) resultant vector, e.g., one-dimensional vector (block 632). The method 600 may continue with the processing logic labeling the data points within the 1D resultant vector with known classification statuses (block 644), to generate a labeled training dataset that can be ingested during placement training as described herein (block 636). The labeled training dataset may continue to be updated through future feedback from the classification stage 651 (block 642). The method 600 may continue with the processing logic performing supervised machine learning using the labeled training dataset, to generate a trained supervised machine learning model (block 640). The trained supervised ML model may then be applied during classification as will be explained.

In various embodiments, the training stage 601 may be performed offline, e.g., by the computing device 150 within the cloud. The method blocks 608 through 632 may be referred to as data pre-processing, e.g., the preparation of the CSI stream for machine learning according to a supervised ML model such as support vector machines (SVM) or other classification-based or regression-based learning models.

In machine learning, support vector machines (SVMs, also support vector networks) are supervised learning models with associated learning algorithms that analyze data used for classification and regression analysis. Given a set of training examples, each marked as belonging to one or the other of at least two categories, an SVM training algorithm builds a model that assigns new examples to one category or the other, making it a non-probabilistic binary linear classifier (although methods such as Platt scaling exist to use SVM in a probabilistic classification setting). An SVM model is a representation of the examples as points in space, mapped so that the examples of the separate categories are divided by a clear gap that is as wide as possible. New examples are then mapped into that same space and predicted to belong to a category based on which side of the gap they fall.

In addition to performing linear classification, SVMs may efficiently perform a non-linear classification using what is called the kernel trick, implicitly mapping their inputs into high-dimensional feature spaces. When data are not labeled, supervised learning is not possible, and an unsupervised learning approach may be instead be employed, which attempts to find natural clustering of the data to groups, and then maps new data to these formed groups. The clustering algorithm that provides an improvement to the SVMs is called support vector clustering and is used in industrial applications either when data are not labeled or when only some data are labeled as a preprocessing for a classification pass.

With continued reference to FIG. 6, the method 600 may continue with the processing device, within the classification stage 651, receiving first data indicative of channel properties of a communication link between a wireless receiver (e.g., in the wireless detector 104) and a wireless transmitter (e.g., in the AP device 110) (block 654). In one embodiment, the first data is a CSI stream, but RSSI data may also be included. This "first" data may be data received in real time and for which a presence detection is to be performed with reference to the room in the building. The method 500 may also be extended to cover additional rooms within the building. As will be apparent, the pre-processing steps within the classification stage 651 match those performed during the training stage 601; accordingly, detailed explanations will not be repeated with reference to the latter.

The method 600 may continue with the processing logic performing interpolation of the first data to obtain interpolated data (block 658). The interpolated data may include equidistant data points that embody the channel properties, e.g., to provide a smoothing affect to the first data. The method 600 may continue with the processing logic filtering the interpolated data with an infinite impulse response (IIR) filter to generate filtered data having reduced noise compared to the interpolated data (block 662).

With continued reference to FIG. 6, the method 600 may continue with the processing logic executing a FFT on the filtered data to generate a data stream in the frequency domain (block 666). The method 600 may continue with the processing logic extracting frequency components from the data stream in the frequency domain, e.g., the Doppler spectrum matrix, $H_{freq}$, which are indicative of movement of a human, to generate Doppler spectrum data (block 670). The frequency components may include data points located between DC and approximately 30 Hz.

The method 600 may continue with the processing logic extracting, from the filtered data for the subcarrier, statistical parameter values over a time period and within the time domain (block 674). The statistical parameter values may include one or more of a maximum, a minimum, a mean, a variance, entropy, a mean cross rate, skewness, or kurtosis, each of which was defined above. The method 600 may continue with the processing logic combining these statistical parameter values into a one-dimensional vector (block 676), to generate a combined vector of the statistical parameter values for each subcarrier, where the statistical parameter values are useable as features values to define the supervised ML model (block 678). The method 600 may continue with the processing logic stacking the statistical parameter values with the Doppler spectrum data within a one-dimensional (1D) resultant vector, e.g., a larger one-dimensional vector containing the feature values (block 682), to generate a dataset for the supervised ML model 158 that includes both time domain and frequency domain values (block 686). For example, the method 600 may stack the variance with the Doppler spectrum according to Equation (14). Similarly, other statistical parameters from Equation (5)-(13) may be stacked to obtain a larger size feature vector for ML.

$$Y_{feature} = [|\tilde{h}(1,f_1)| \ldots |\tilde{h}(1,f_{30\ Hz})| \ldots |\tilde{h}(N_{sc},f_1)| \ldots |\tilde{h}(N_{sc},f_{N_{fft}})| \text{var}(1) \ldots \text{var}(N_{sc})] \quad (14)$$

With continued reference to FIG. 6, the method 600 may continue with the processing device classifying, via execution of the trained supervised ML model (block 640), data of the dataset to distinguish the movement within the building from stationary objects (block 688), which results in a presence detection or detection of idle channels (block 690). The presence detection may be indicative of the presence of a human. In another embodiment, the results can be a motion detection or a non-motion detection. In one embodiment, the pre-processing of blocks 674, 676, 678, and 682 are skipped. While skipping the inclusion of time-domain statistical parameters may create a less rich dataset, such a simplified embodiment may still be employed and thus classification may be performed on the Doppler spectrum data (instead of the dataset) using the supervised ML model.

The method 600 may continue with the processing logic outputting a presence decision with reference to at least a portion of the incoming CSI stream (block 694). In one embodiment, the presence decision is binary, e.g., "presence detected" or "presence not detected," although in other embodiments the decision may be indicated with a non-binary value. As will be discussed in further detail, a plurality of presence decisions may be output over a shifting time window, to avoid a false-negative detection.

Figure 7A:
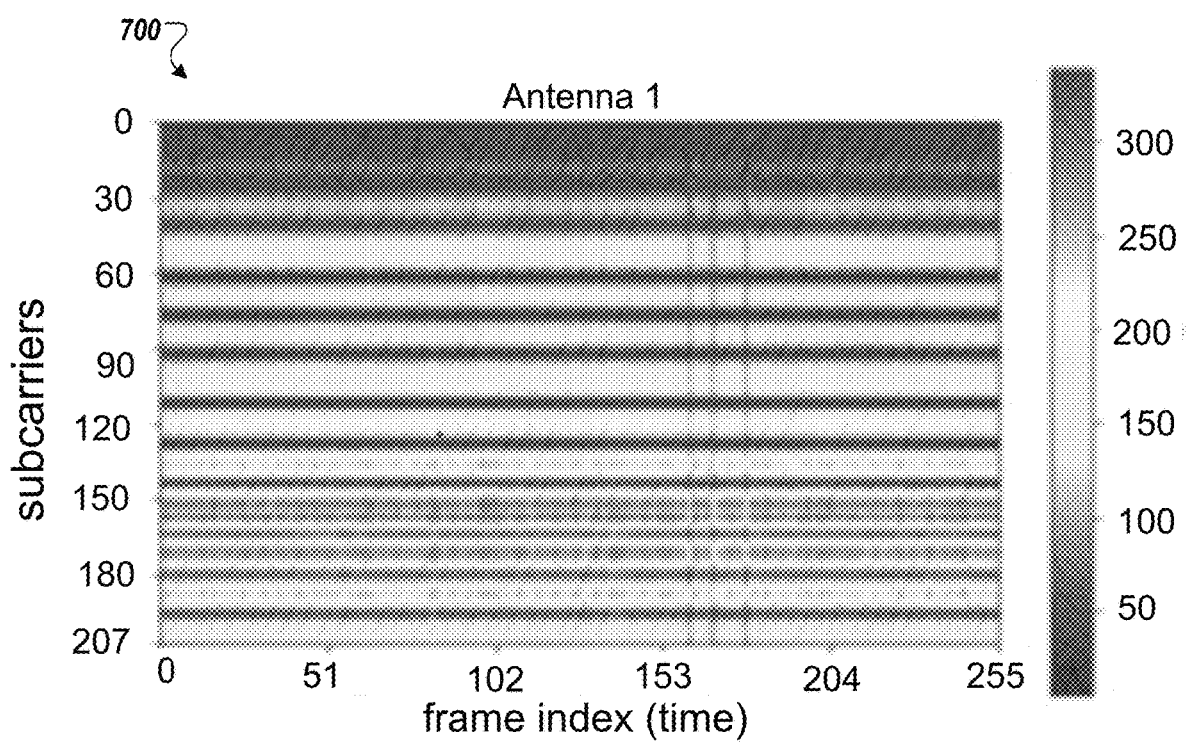
FIG. 7A illustrates a sequence of CSI vectors for a first antenna during no-motion, according to at least one embodiment.
Figure 7B:
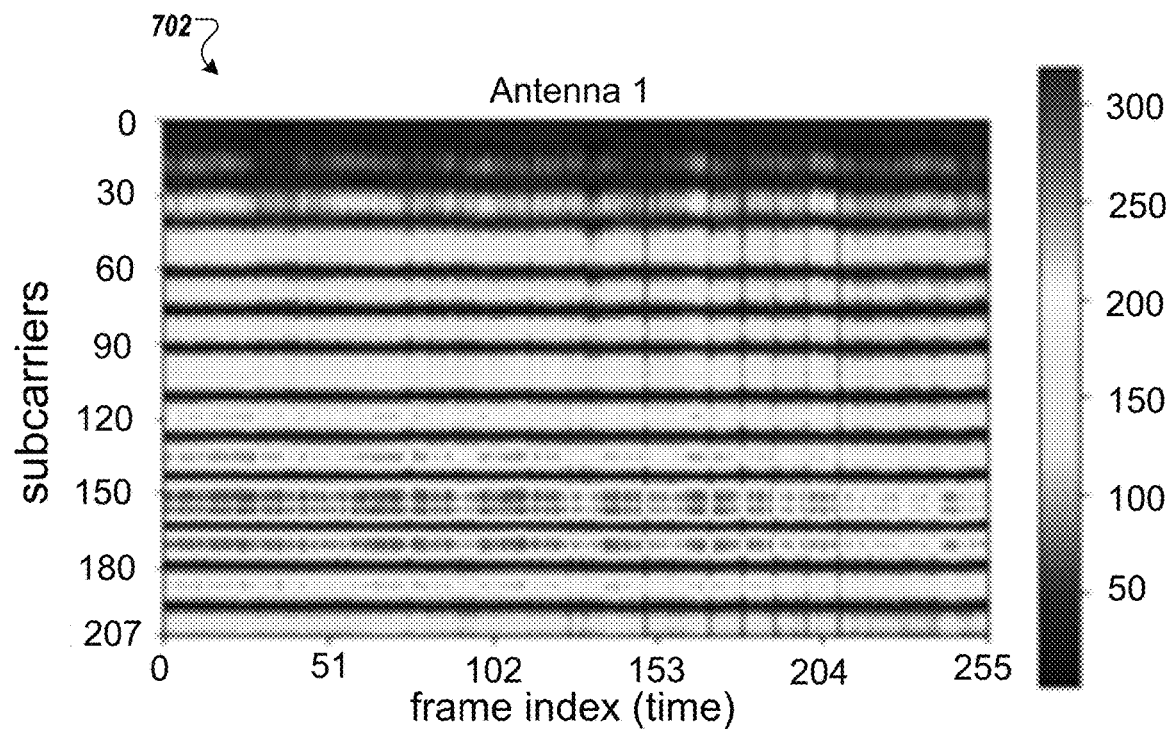
FIG. 7B illustrates a sequence of CSI vectors for the first antenna during no-motion, according to at least one embodiment.
Figure 7C:
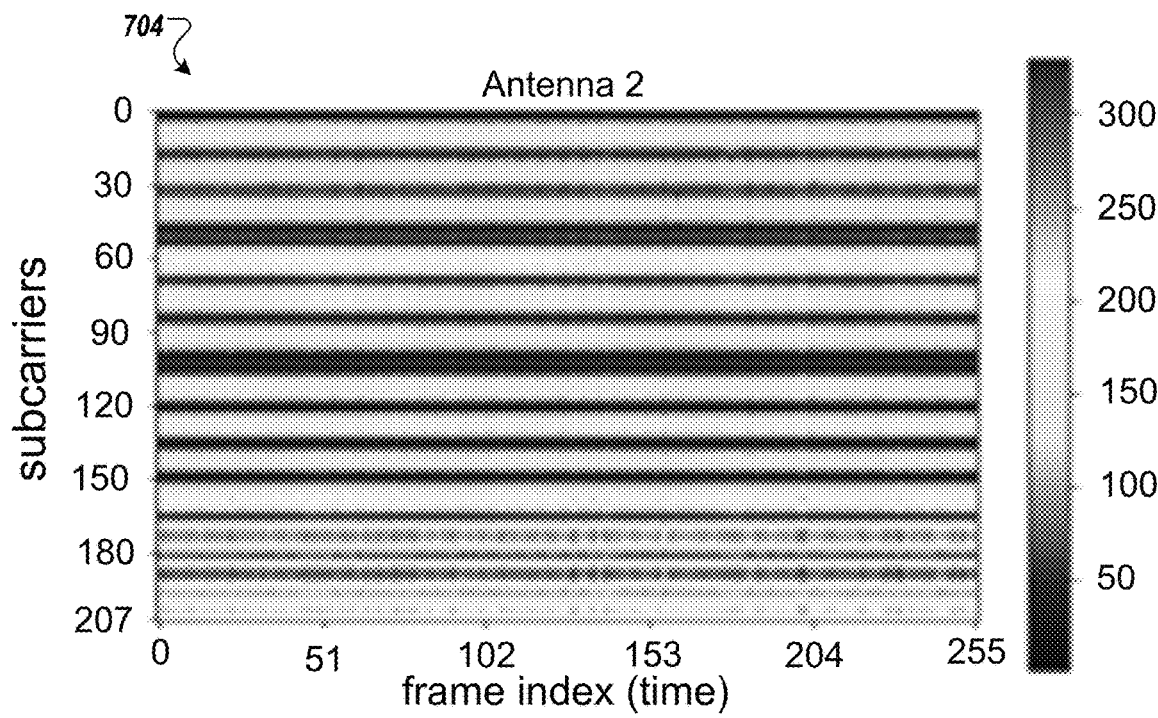
FIG. 7C illustrates a sequence of CSI vectors for a second antenna during no-motion, according to at least one embodiment.
Figure 7D:
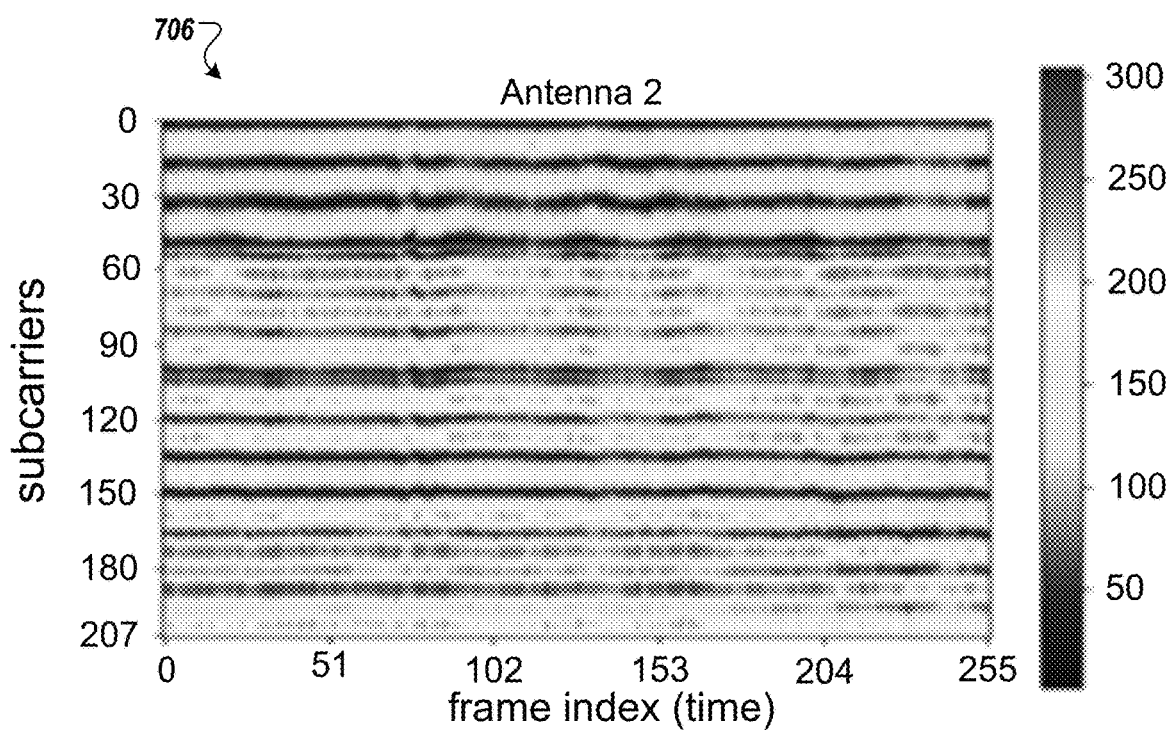
FIG. 7D illustrates a sequence of CSI vectors for the second antenna during no-motion, according to at least one embodiment.

In another embodiment, assuming a number of receiver-transmitter links, Nrt and a number of subcarriers, Nsc, then a CSI vector is a complex vector of length Nsc along a link between a receiver and a transmitter. Only the magnitude of the complex entries in the vector can be considered. A CSI capture is a matrix obtained by stacking the CSI vectors along all the links. Denote the ith capture by $H_i$. Then $H_i$ is a matrix of size Nsc×Nrt. Also, denote the ith CSI vector along link 1 by $H_{i,l}$ and the sequence of CSI vectors along link 1 by $H_i$. Overall, $H_{i,l}$ is a 3D tensor of size I×Nsc×Nrt. FIGS. 7A-7E illustrate samples of a sequence of CSI vectors for two of the links during motion and no-motion. In particular, FIG. 7A illustrates a sequence of CSI vectors 700 for a first antenna during no-motion and FIG. 7B illustrates a sequence of CSI vectors 702 for the first antenna during motion. FIG. 7C illustrates a sequence of CSI vectors 704 for a second antenna during no-motion and FIG. 7D illustrates a sequence of CSI vectors 706 for the second antenna during motion.

Figure 7E:
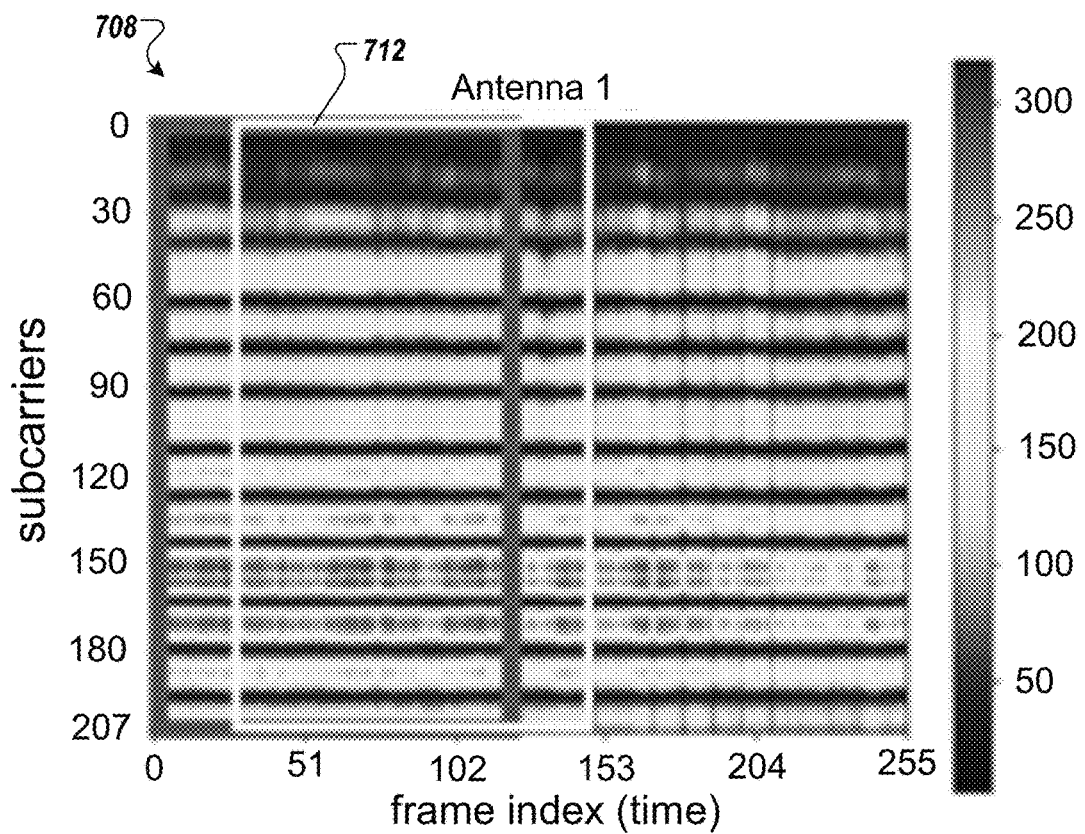
FIGS. 7E-7F illustrate two of the CSI frames along each links, constructed by sliding a window of size 128 and a stride of 33 on the CSI vectors along these links, according to at least one embodiment.
Figure 7F:
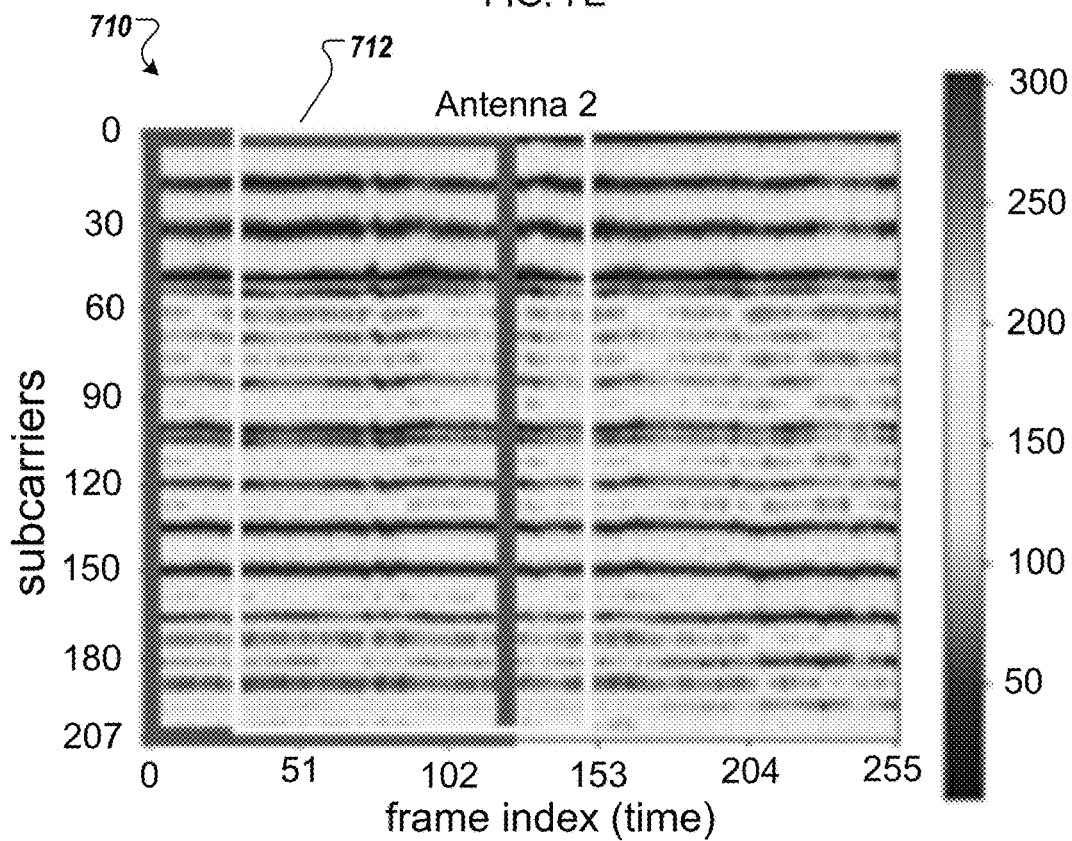

From the sequence of CSI vectors $H_{i,l}$, the processing logic constructs a sequence of CSI frames $X_{i,l}$ by sliding a window 712 of a fixed size and a fixed stride along the sequence of CSI vectors along each link. FIGS. 7E-7F illustrate two of the CSI frames along each links, constructed by sliding a window of size 128 and a stride of 33 on the CSI vectors along these links. It should be noted that the ith CSI frame along link 1, $X_{i,l}$ is a matrix with Nsc rows and the number of columns equal to the length of the sliding window. The (j, k)th element of this matrix is given by $X_{i,l}(j, k)$.

In at least one embodiment, the statistic parameter values used to validate a CSI frame can include the following equations for the temporal mean along the jth subcarrier (15):

$$\mu_{i,l}(j) = \frac{\sum_k X_{i,l}(j, k)}{\text{sliding window size}} \quad (15)$$

The temporal variation along the jth subcarrier (16):

$$\sigma^2_{i,l}(j) = \frac{\sum_k (X_{i,l}(j, k) - \mu_{i,l})^2}{\text{sliding window size}} \quad (16)$$

The temporal variation along the jth subcarrier (16):

$$\sigma^2_{i,l}(j) = \frac{\sum_k (X_{i,l}(j, k) - \mu_{i,l})^2}{\text{sliding window size}} \quad (16)$$

In another embodiment, the preprocessing of a CSI frame can include subcarrier spacing, subcarrier (spatial) normalization, temporal normalization, 2D FFT plus shifting and log transform, cropping the temporal dimension, and removing first and last few columns. FIGS. 8A-8F illustrate a CSI frame during no-motion undergoing preprocessing, according to at least one embodiment. FIGS. 9A-9F illustrate a CSI frame during motion undergoing preprocessing, according to at least one embodiment.

Figure 8A:
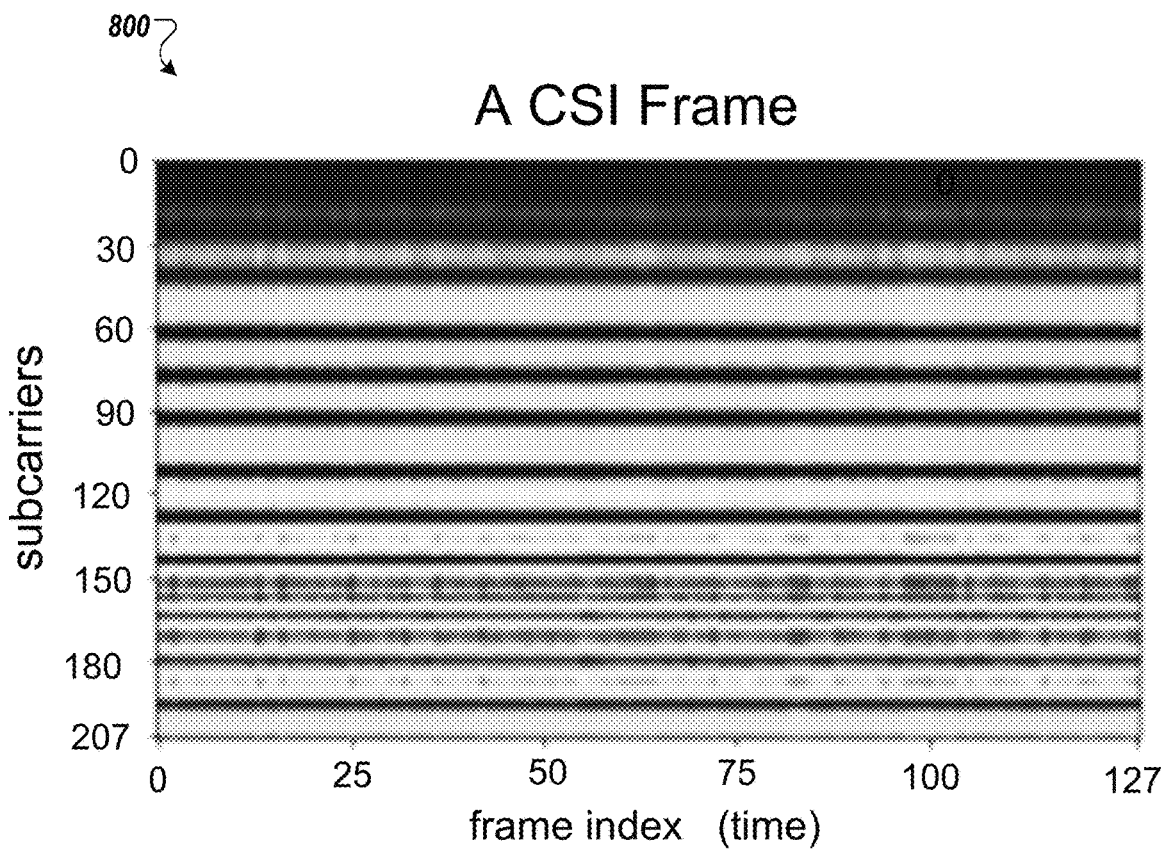
FIGS. 8A-8F illustrate a CSI frame during no-motion undergoing preprocessing, according to at least one embodiment.
Figure 8B:
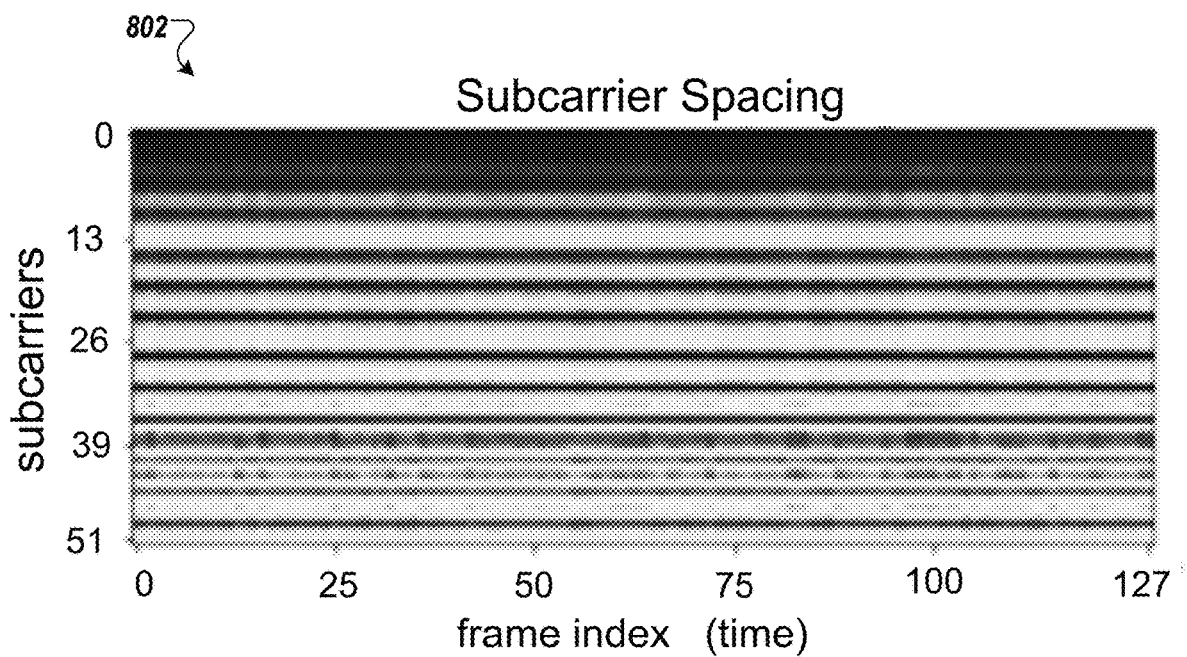

FIG. 8A illustrates a CSI frame 800 during no-motion before preprocessing according to at least one embodiment. The processing logic can perform subcarrier spacing. For example, given a CSI frame of $X_1=X_{i,l}$, a subcarrier spacing can be done by taking every sth subcarrier: $X_2(j, k)=X_1$, (4j−3, k). This can remove redundant subcarriers and reduce memory complexity. FIG. 8B illustrates a CSI frame 802 during no-motion preprocessed with subcarrier spacing according to at least one embodiment. For subcarrier (spatial) normalization, the processing logic can do a 2-norm normalization across subcarriers:

$$X_3(j, k) = \frac{x_2(j, k)}{\left(\sum_j x_2(j, k)^2\right)^{1/2}}.$$

Figure 8C:
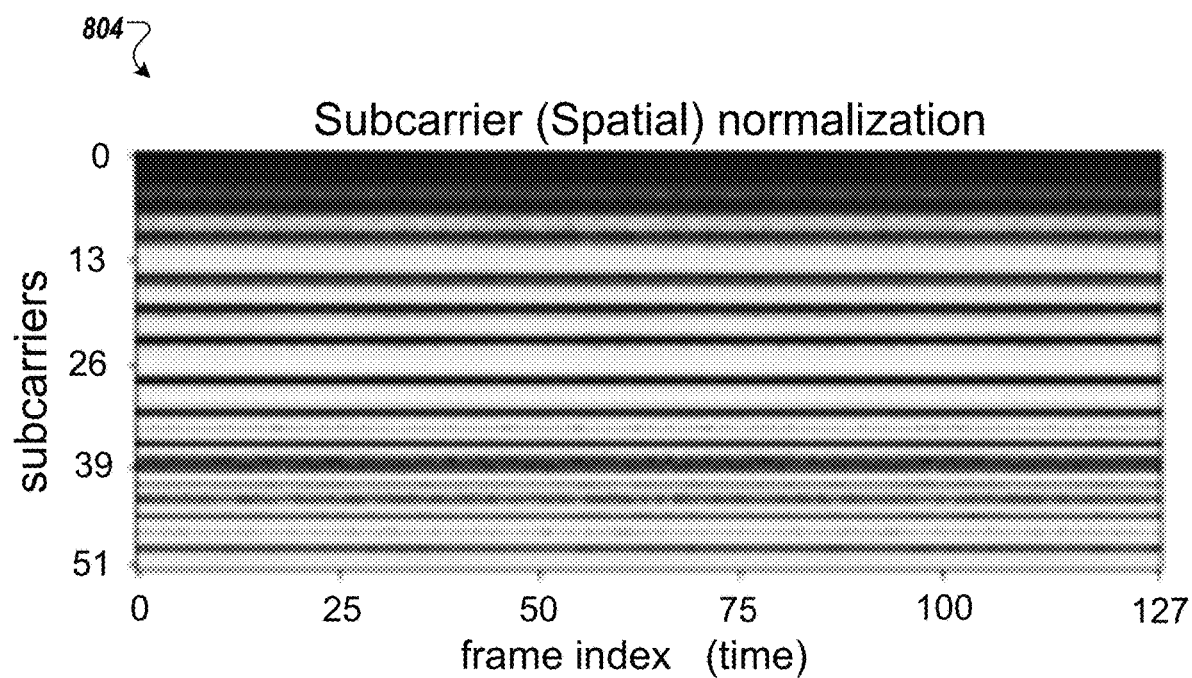

This can smooth the values across subcarriers and time. FIG. 8C illustrates a CSI frame 804 during no-motion preprocessed with subcarrier (spatial) normalization according to at least one embodiment. For temporal normalization, the processing logic can perform elementwise division of all columns by the first column:

$$X_4(j, k) = \frac{X_3(j, k)}{X_3(j, 1)}.$$

Figure 8D:
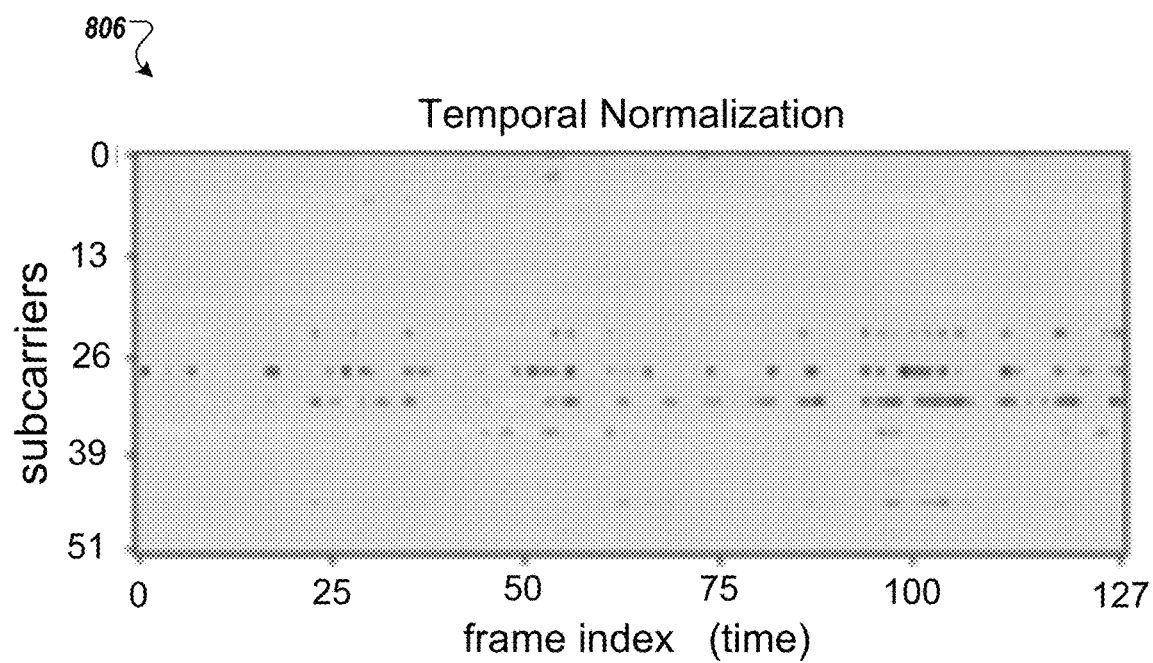
Figure 8E:
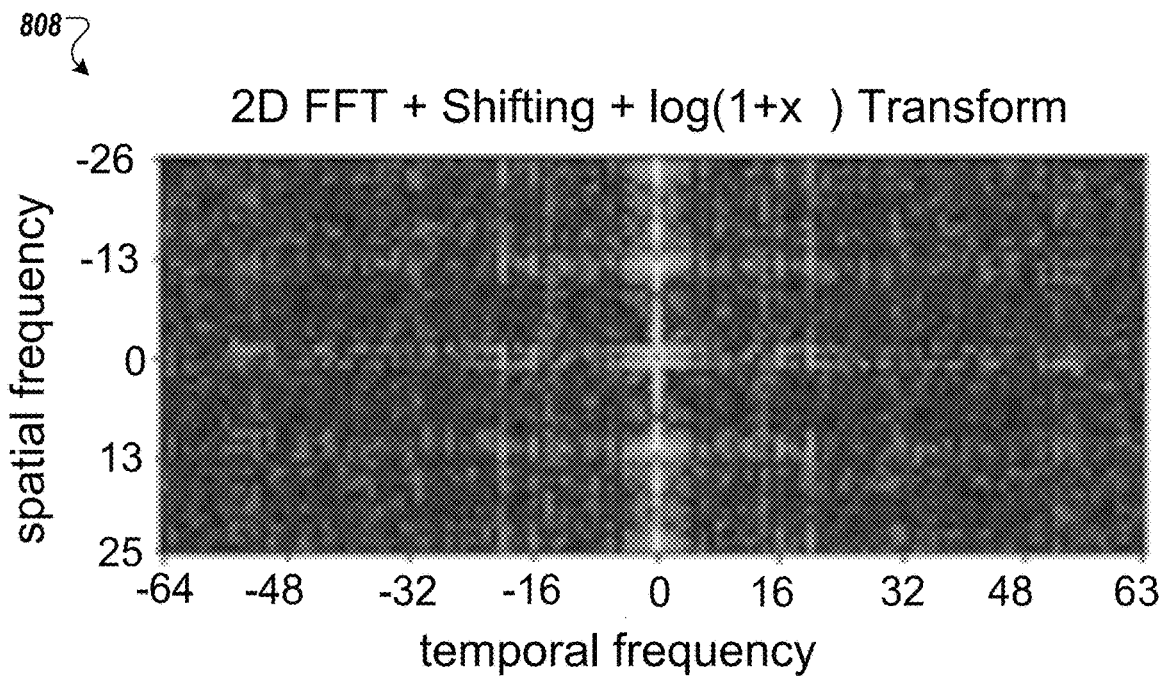
Figure 8F:
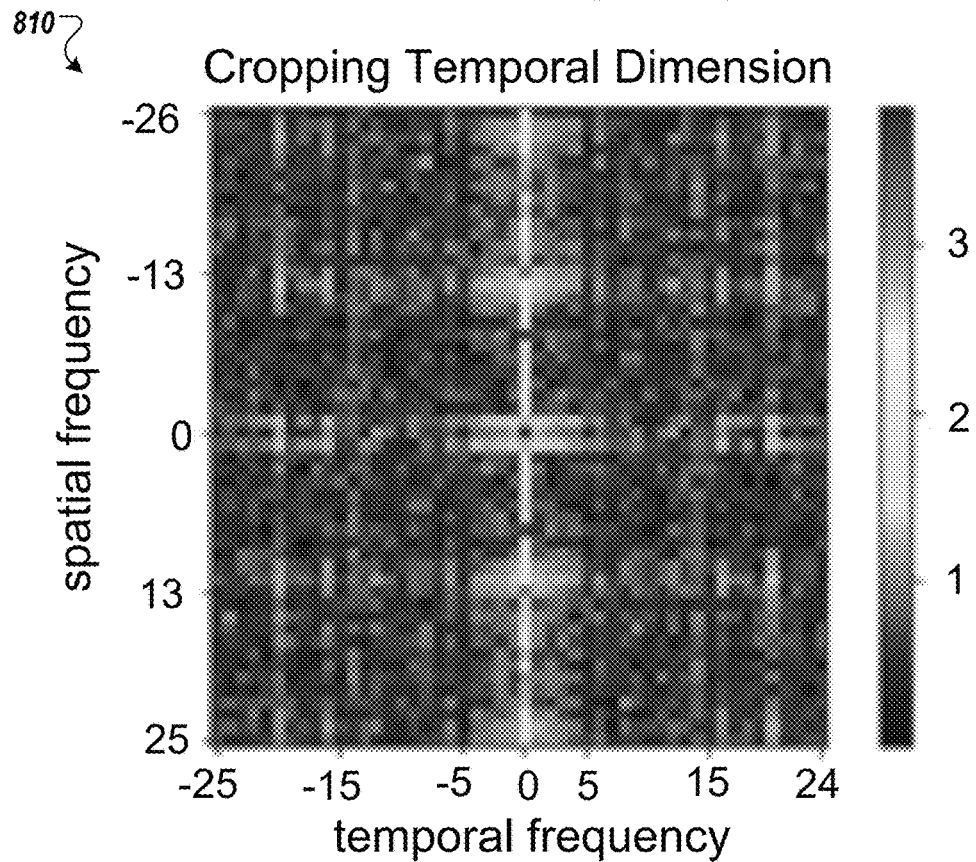

This can increase robustness of the ML models. FIG. 8D illustrates a CSI frame 806 during no-motion preprocessed with temporal normalization according to at least one embodiment. For 2D FFT plus shifting and log transform, the processing logic can apply 2D FFT, obtain magnitude, shift the result so that zero frequency is at the center of the image and apply a function: $\tilde{X}_4=[2DFFT(X_4)]$ such that zero frequency is shifted at the center and $X_5=\log(1+X_4(j, k))$. This can change the values to the frequency domain to analyze spectral features and reduce disparity among magnitude values. FIG. 8E illustrates a CSI frame 808 during no-motion preprocessed with 2D FFT plus shifting and log transform according to at least one embodiment. For cropping temporal dimension, the processing logic can remove the high temporal frequencies: $X_6$=remove first and last few columns of $X_5$. This can prevent sudden changes in CSI due to hardware problems, or the like, from affecting the ML model training. The final results can be denoted as $X_6$ by $Y_{i,l}$. FIG. 8F illustrates a CSI frame 810 during no-motion preprocessed with cropping temporal dimension according to at least one embodiment.

Figure 9A:
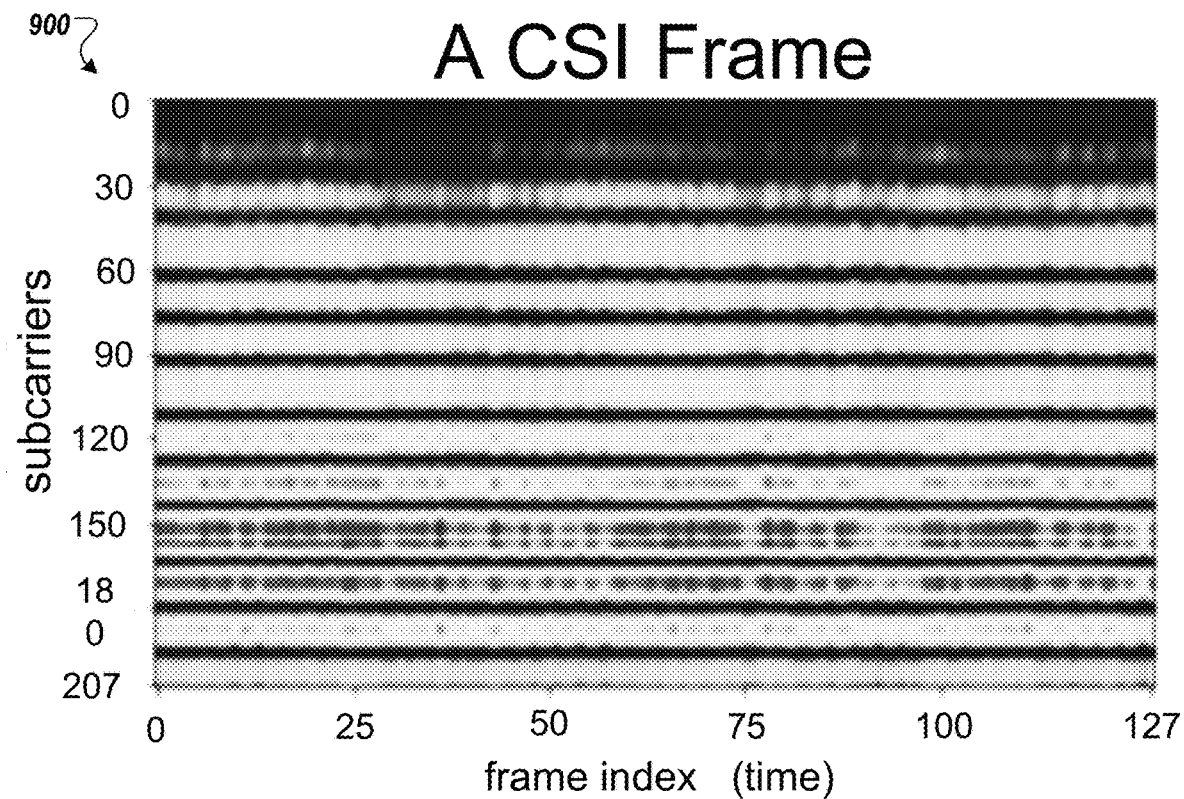
FIGS. 9A-9F illustrate a CSI frame during motion undergoing preprocessing, according to at least one embodiment.
Figure 9B:
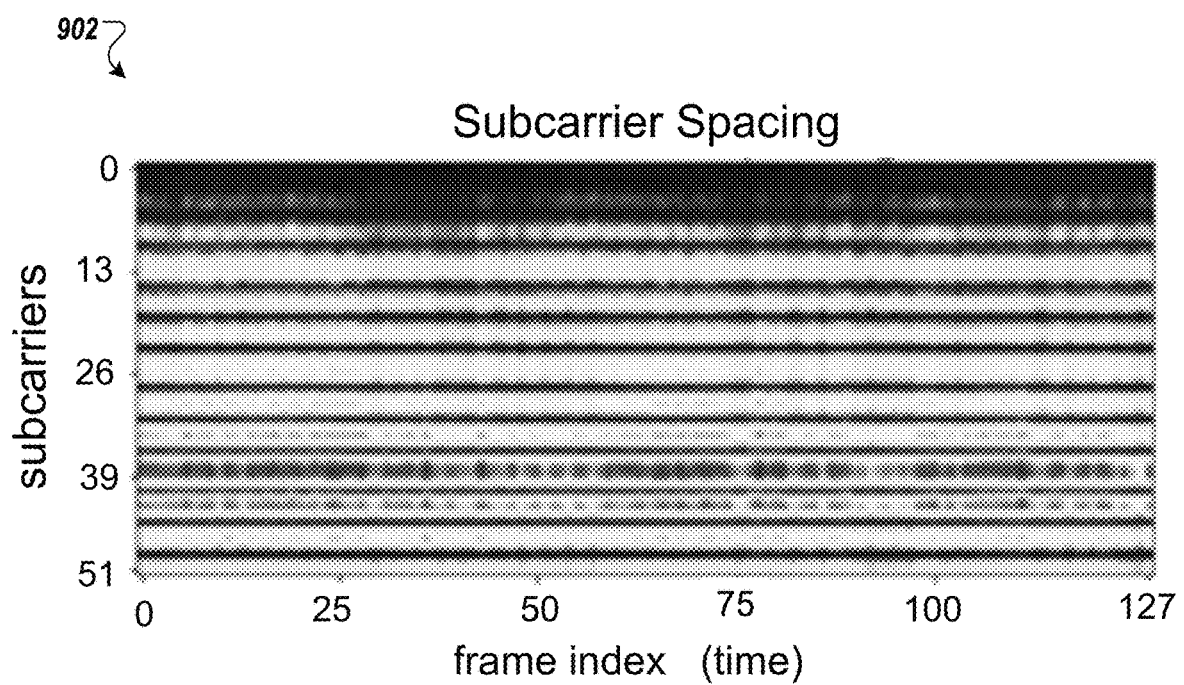
Figure 9C:
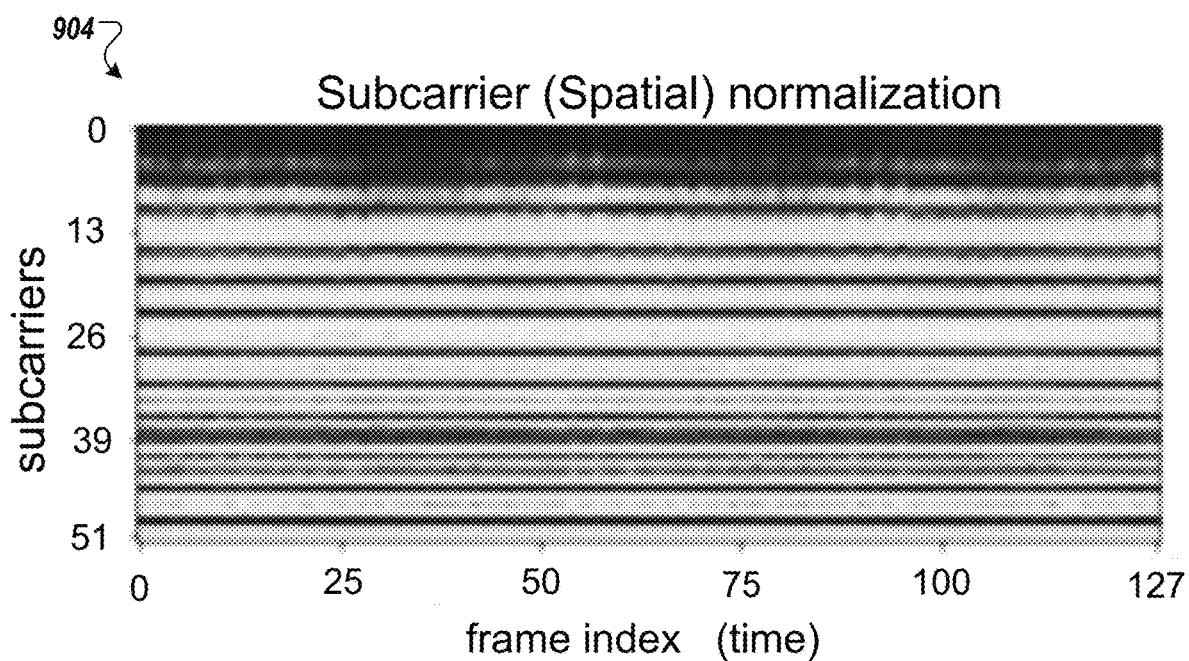
Figure 9D:
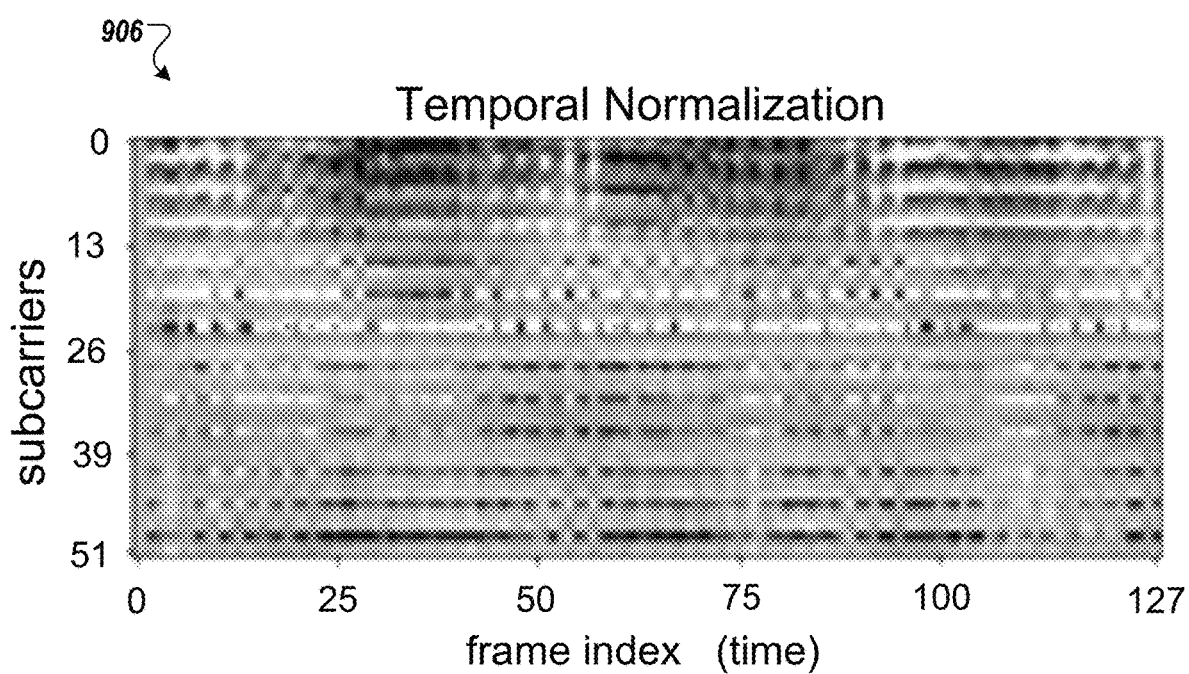
Figure 9E:
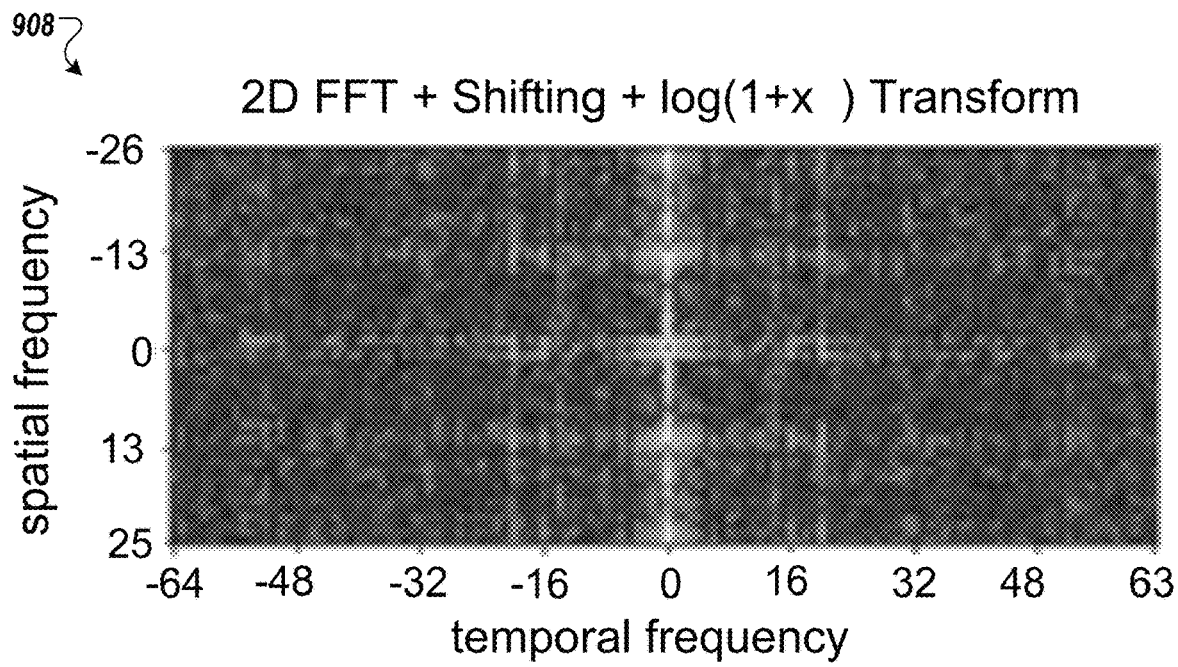
Figure 9F:
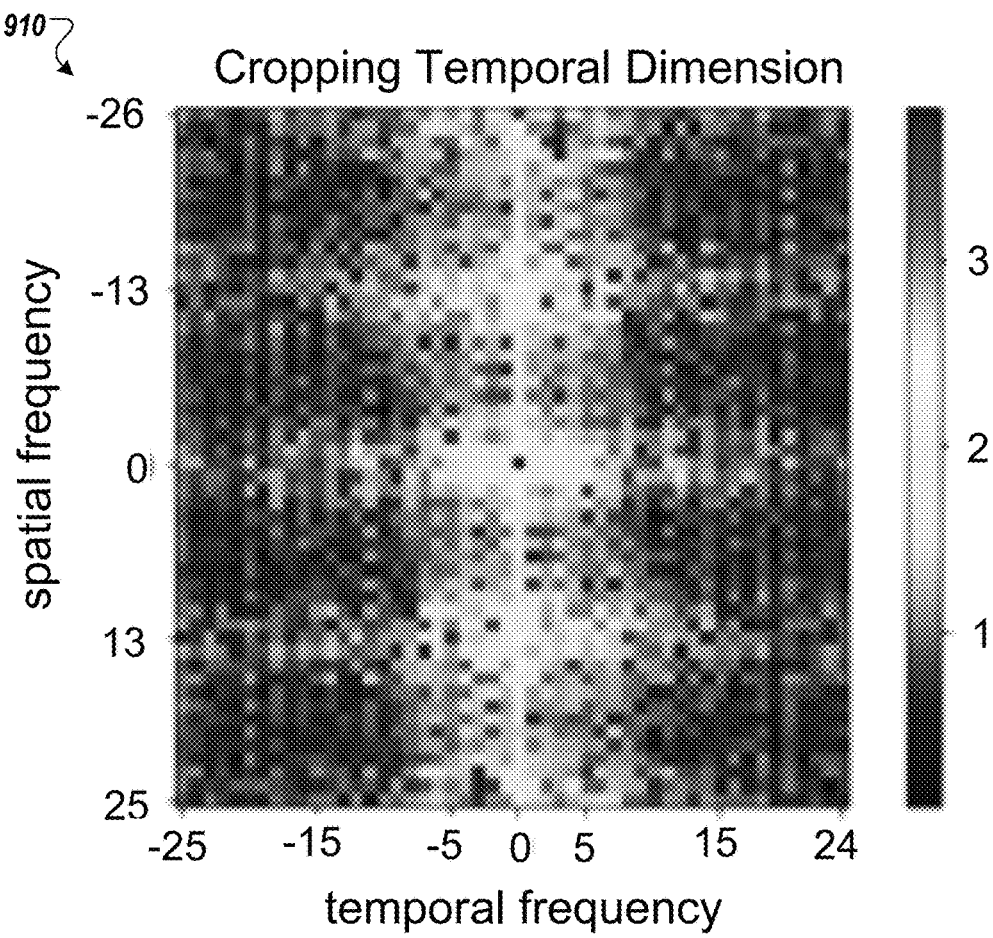

For comparisons, FIG. 9A illustrates a CSI frame 900 during motion before preprocessing according to at least one embodiment. FIG. 9B illustrates a CSI frame 902 during motion preprocessed with subcarrier spacing according to at least one embodiment. FIG. 9C illustrates a CSI frame 904 during motion preprocessed with subcarrier (spatial) normalization according to at least one embodiment. FIG. 9D illustrates a CSI frame 906 during motion preprocessed with temporal normalization according to at least one embodiment. FIG. 9E illustrates a CSI frame 808 during motion preprocessed with 2D FFT plus shifting and log transform according to at least one embodiment. FIG. 9F illustrates a CSI frame 910 during motion preprocessed with cropping temporal dimension according to at least one embodiment.

In at least one embodiment, a ML model can take the preprocessed CSI frame (or a sequence of it) as input and predict a binary label (or a sequence of it) as output. The binary label can correspond to a presence of motion or not.

Figure 10:
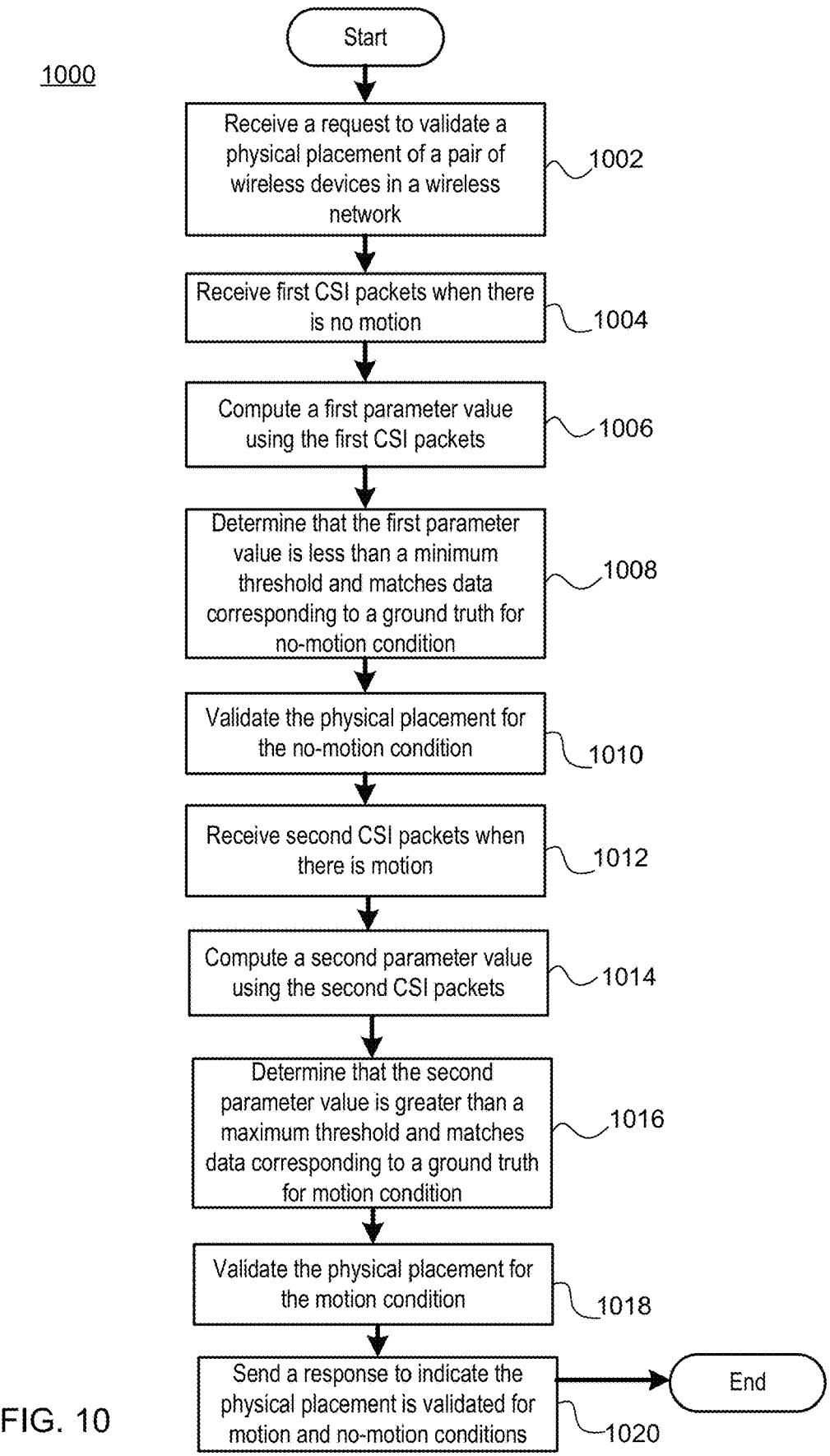
FIG. 10 is a flow diagram of a method for device placement for motion detection using CSI data with a multi-level analysis process, according to at least one embodiment.

FIG. 10 is a flow diagram of a method 1000 for device placement for motion detection using CSI data with a multi-level analysis process, according to at least one embodiment. Method 1000 may be performed by processing logic that may comprise hardware (e.g., circuitry, dedicated logic, programmable logic, microcode, etc.), software (such as instructions running on the processor), firmware, or a combination thereof. In one embodiment, a processor of the wireless detector 104, of the computing device 150, or of the wireless device 120 performs the method 1000. Alternatively, other components of a disclosed device may perform some or all of the operations of the method 1000.

With further reference to FIG. 10, the method 1000 may begin with the processing logic receiving, from a user device, a request to validate physical placement of a pair of wireless devices in a wireless network (block 1002). The pair of wireless devices is used for detecting a motion condition and a no-motion condition within a building, such as a home or an office. The processing logic receives first CSI packets representing channel properties of a wireless channel used by a pair of wireless devices when there is no motion within the home (block 1004). The processing logic computes a first parameter value (e.g., first RF link values, first statistical parameter value, first ML derived value) using the first CSI packets (block 1006). The first parameter value is at least one of a mean, a FFT mean, a standard deviation, or a FFT standard deviation. The processing logic determines that the first parameter value is less than a first threshold and matches data corresponding to first ground truth for the no-motion condition (block 1008). The processing logic validates a first physical placement of the pair of wireless devices for the no-motion condition (block 1010). The processing logic receives second CSI packets representing channel properties of the wireless channel between the pair of wireless devices when there is motion within the home (block 1012). The processing logic computes a second parameter value (e.g., second RF link values, second statistical parameter value, second ML derived value) using the second CSI packets (block 1014). The second parameter value is at least one of a mean, a FFT mean, a standard deviation, or a FFT standard deviation. The processing logic determines that the second parameter value is greater than a second threshold (block 1016). The processing logic determines that a first confidence score, associated with the second CSI packets, is greater than a first confidence threshold and matches data corresponding to second ground truth for the motion condition (block 1018). The first confidence threshold represents a lowest confidence value for detecting the motion condition. The processing logic validates the first physical placement of the pair of wireless devices for the motion condition (block 1020) and sends, to the user device, a response indicating that the first physical placement of the pair of wireless devices is validated for the motion condition and the no-motion condition (block 1022); and the method 1000 ends.

In at least one embodiment, the operations of FIG. 10 are performed in a second-level analysis. The second-level analysis can be based on parameter values, instead of machine learning based analysis.

In a further embodiment, the processing logic receives, from the user device, a request to validate physical placement of another pair of wireless devices in the wireless network. The processing logic receives third CSI packets representing channel properties of a second wireless channel between the other pair of wireless devices. The processing logic determines that a size of the third CSI packets does not exceed a minimum threshold or the third CSI packets are not received in a specified time interval. The processing logic sends, to the user device, a response indicating that the physical placement of the pair of wireless devices is validated for the motion condition and the no-motion condition. In at least one embodiment, the processing logic can perform these operations in a first-level analysis to check the RF link for network issues before performing operations associated with the second-level analysis, such as set forth above.

In a further embodiment, the processing logic receives, from the user device, a request to validate physical placement of another pair of wireless devices in the wireless network. The processing logic receives third CSI packets representing channel properties of a second wireless channel between the other pair of wireless devices when there is motion within the home. The processing logic computes a third parameter value (e.g., third RF link values, third statistical parameter value, third ML derived value) using the third CSI packets and determines that the third parameter value is greater than the maximum threshold. The third parameter value is at least one of a mean, a FFT mean, a standard deviation, or a FFT standard deviation. The processing logic determines that a second confidence score, associated with the third CSI packets, is less than the first confidence threshold. The processing logic performs clustering on the third CSI packets to obtain clustering data. The processing logic determines that a third confidence score, representing a similarity between the clustering data and historical data, is greater than a second confidence threshold. The second confidence threshold represents a lowest confidence value acceptable for validating the placement of devices. The processing logic sends, to the user device, a response indicating that the physical placement of the other pair of wireless devices is validated for the motion condition and the no-motion condition. In at least one embodiment, the processing logic can perform these operations in a third-level analysis in the event that the placement cannot be validated in the second-level analysis, such as set forth above.

In another embodiment, the processing logic receiving first CSI data representing channel properties of a wireless channel between a first wireless device and a second wireless device in a wireless network. The processing logic determines that a size of the first CSI data exceeds a first threshold or the first CSI data is received in a specified time interval. The processing logic validates a first physical placement of the first wireless device and the second wireless device by: i) determining that a first parameter value associated with the first CSI data is less than a second threshold representing a no-motion condition and the first CSI data matches first ground truth data associated with the no-motion condition; or ii) determining that the first parameter value is greater than a third threshold representing a motion condition and the first CSI data matches second ground truth data associated with the motion condition. The processing logic sends to a user device an indication that the first physical placement of the first wireless device and the second wireless device is validated. In at least one embodiment, these operations are performed in the second-level analysis.

In a further embodiment, the processing logic receives second CSI data representing channel properties of the wireless channel at a different time than receiving the first CSI data, wherein the first wireless device and the second wireless device are located at a second physical placement at the different time. The processing logic determines that a size of the second CSI data does not exceed the first threshold or the second CSI data is not received in a specified time interval. The processing logic sends to the user device a second indication that the second physical placement of the first wireless device and the second wireless device is not validated. In at least one embodiment, these operations are performed in the first-level analysis. In another embodiment, the processing logic receives second CSI data representing channel properties of the wireless channel at a different time than receiving the first CSI data, wherein the first wireless device and the second wireless device are located at a second physical placement at the different time. The processing logic determines that a size of the second CSI data does not exceed the first threshold or the second CSI data is not received in a specified time interval. The processing logic identifies a network issue with the wireless channel using at least one of the second CSI data, RSSI data, airtime utilization data, or congestion statistic data. The processing logic sends to the user device a second indication that the second physical placement of the first wireless device and the second wireless device is not validated. In at least one embodiment, these operations are performed in the first-level analysis.

In another embodiment, the processing logic receives second CSI data representing channel properties of the wireless channel at a different time than receiving the first CSI data, wherein the first wireless device and the second wireless device are located at a second physical placement at the different time. The processing logic determines that a size of the second CSI data does exceeds the first threshold or the second CSI data is received in the specified time interval. The processing logic can filter the second CSI data to obtain filtered CSI data and can calculate a second statistical parameter value using the filtered CSI data. In another embodiment, the processing logic receives second CSI data representing channel properties of the wireless channel at a different time than receiving the first CSI data, wherein the first wireless device and the second wireless device are located at a second physical placement at the different time. The processing logic determines that a size of the second CSI data does exceeds the first threshold or the second CSI data is received in the specified time interval. The processing logic can filter the second CSI data to obtain filtered CSI data. The processing logic can convert the filtered CSI data into FFT data and calculate a second statistical parameter value using the FFT data. In at least one embodiment, these operations are performed as part of the first-level analysis or the second-level analysis.

In a further embodiment, the processing logic receives second CSI data representing channel properties of the wireless channel at a different time than receiving the first CSI data, wherein the first wireless device and the second wireless device are located at a second physical placement at the different time. The processing logic determines that a size of the second CSI data exceeds the first threshold or the second CSI data is received in the specified time interval. The processing logic determines a second statistical parameter value associated with the second CSI data. The processing logic determines that the second physical placement of the first wireless device and the second wireless device is not validated using the second statistical parameter value. The processing logic validates the second physical placement of the first wireless device and the second wireless device by: performing clustering on the second CSI data to obtain clustering data; determining a confidence score representing a similarity between the clustering data and historical data; and determining that the confidence score is greater than a confidence threshold, wherein the confidence threshold represents a lowest confidence value acceptable for validating the second physical placement of devices. The processing logic sends to the user device a second indication that the physical placement of the first wireless device and the second wireless device is validated. In at least one embodiment, these operations are performed in the third-level analysis.

In another embodiment, the processing logic receives second CSI data representing channel properties of the wireless channel at a different time than receiving the first CSI data, wherein the first wireless device and the second wireless device are located at a second physical placement at the different time. The processing logic determines that a size of the second CSI data exceeds the first threshold or the second CSI data is received in the specified time interval. The processing logic determines a second statistical parameter value associated with the second CSI data and determines that the second physical placement of the first wireless device and the second wireless device is not validated using the second statistical parameter value. The processing logic performs clustering on the second CSI data to obtain clustering data and determines a confidence score representing a similarity between the clustering data and historical data. The processing logic determines that the confidence score is less than a confidence threshold. The confidence threshold represents a lowest confidence value acceptable for validating the second physical placement of devices. The processing logic sends to the user device a second indication that the second physical placement of the first wireless device and the second wireless device is not validated. The processing logic receives a request to initiate local training for the motion condition with the first wireless device and the second wireless device at the second physical placement. In at least one embodiment, these operations are performed in the third-level analysis.

In another embodiment, the processing logic receives second CSI data representing channel properties of the wireless channel at a different time than receiving the first CSI data, wherein the first wireless device and the second wireless device are located at a second physical placement at the different time. The processing logic determines that a size of the second CSI data exceeds the minimum threshold or the second CSI data is received in the specified time interval. The processing logic determines a second statistical parameter value associated with the second CSI data and determines that the second physical placement of the first wireless device and the second wireless device is not validated using the second statistical parameter value. The processing logic performs clustering on the second CSI data to obtain clustering data and determines that the clustering data does not match historical data. The processing logic sends to the user device a request to change the second physical placement of one or more of the first wireless device and the second wireless device. In at least one embodiment, these operations are performed in the third-level analysis.

Figure 11:
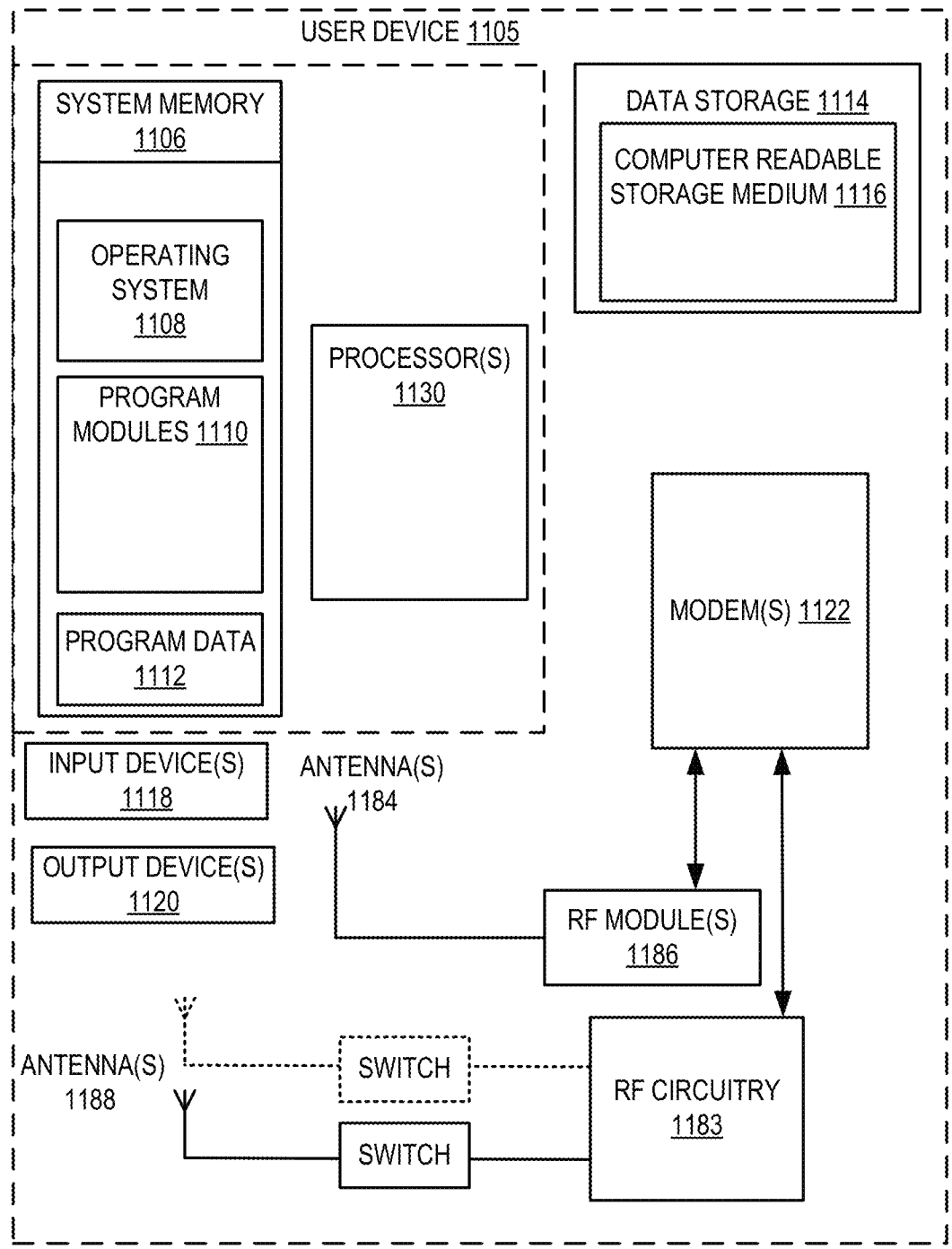
FIG. 11 is a block diagram of a user device in which embodiments of device placement using a multi-level analysis process may be implemented.

FIG. 11 is a block diagram of a user device 1105 in which embodiments of device placement using a multi-level analysis process may be implemented. The user device 1105 may correspond to the wireless detector 104, the access point device 110, or the wireless device 120 of FIG. 1C. The user device 1105 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1105 may be any portable or stationary user device. For example, the user device 1105 may be an intelligent voice control and speaker system. Alternatively, the user device 1105 can be any other device used in a WLAN network (e.g., Wi-Fi® network), a WAN network, or the like.

The user device 1105 includes one or more processor(s) 1130, such as one or more CPUs, microcontrollers, field programmable gate arrays, or other types of processors. The user device 1105 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of the methods as described herein. The user device 1105 performs functions by using the processor(s) 1130 to execute instructions provided by the system memory 1106.

The user device 1105 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the user device 1105, the system memory 1106, and the processor(s) 1130 also constituting computer-readable media. The user device 1105 may also include one or more input devices 1118 (keyboard, mouse device, specialized selection keys, etc.) and one or more output devices 1120 (displays, printers, audio output mechanisms, etc.).

The user device 1105 further includes a modem 1122 to allow the user device 1105 to communicate via a wireless network (e.g., such as provided by the wireless communication system) with other computing devices, such as remote computers, an item providing system, and so forth. The modem 1122 can be connected to RF circuitry 1183 and zero or more RF modules 1186. The RF circuitry 1183 may be a WLAN module, a WAN module, PAN module, or the like. Antennas 1188 are coupled to the RF circuitry 1183, which is coupled to the modem 1122. Zero or more antennas 1184 can be coupled to one or more RF modules 1186, which are also connected to the modem 1122. The zero or more antennas 1184 may be GPS antennas, NFC antennas, other WAN antennas, WLAN or PAN antennas, or the like. The modem 1122 allows the user device 1105 to handle both voice and non-voice communications (such as communications for text messages, multimedia messages, media downloads, web browsing, etc.) with a wireless communication system. The modem 1122 may provide network connectivity using various types of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 1122 may generate signals and send these signals to antenna 1188, and 1184 via RF circuitry 1183, and RF module(s) 1186 as descried herein. User device 1105 may additionally include a WLAN module, a GPS receiver, a PAN transceiver, and/or other RF modules. These RF modules may additionally or alternatively be connected to one or more of antennas 1184, 1188. Antennas 1184, 1188 may be configured to transmit in different frequency bands and/or using different wireless communication protocols. The antennas 1184, 1188 may be directional, omnidirectional, or non-directional antennas. In addition to sending data, antennas 1184, 1188 may also receive data, which is sent to appropriate RF modules connected to the antennas.

In one embodiment, the user device 1105 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band and the second wireless connection is associated with a second resonant mode of the antenna building that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1122 is shown to control transmission and reception via antenna (1184, 1188), the user device 1105 may alternatively include multiple modems, each of which is configured to transmit/receive data via a different antenna and/or wireless transmission protocol.

The user device 1105 delivers and/or receives items, upgrades, and/or other information via the network. For example, the user device 1105 may download or receive items from an item providing system. The item providing system receives various requests, instructions, and other data from the user device 1105 via the network. The item providing system may include one or more machines (e.g., one or more server computer systems, routers, gateways, etc.) that have processing and storage capabilities to provide the above functionality. Communication between the item providing system and the user device 1105 may be enabled via any communication infrastructure. One example of such an infrastructure includes a combination of a wide area network (WAN) and wireless infrastructure, which allows a user to use the user device 1105 to purchase items and consume items without being tethered to the item providing system via hardwired links. The wireless infrastructure may be provided by one or multiple wireless communications systems, such as one or more wireless communications systems. One of the wireless communication systems may be a WLAN hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1105.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1105 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1105 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in art upon reading and understanding the above description. The scope of the present embodiments should, therefore, be determined with reference to the appended claims, along with the full scope of equivalents to which such claims are entitled.

What is claimed is:

1. A method comprising:
   receiving, at a first time, first channel state information (CSI) data representing channel properties of a wireless channel used by a first wireless device and a second wireless device, wherein the first wireless device is located at a first location in an environment and the second wireless device is located at a second location in the environment;
   determining that (i) a size of the first CSI data is less than a first threshold or (ii) the first CSI data is not received in a first specified time interval;
   sending, to a user device, a first indication that the first location of the first wireless device is not valid;
   receiving, at a second time after the first time, second CSI data representing channel properties of the wireless channel, wherein the first wireless device is located at a third location at the second time;
   determining that (iii) a size of the second CSI data exceeds the first threshold or (iv) the second CSI data is received in a second specified time interval;
   determining that the second CSI data corresponds to first ground truth data and indicates that there is no motion in the environment; or
   determining that the second CSI data corresponds to second ground truth data and indicates that there is motion in the environment; and
   sending, to the user device, a second indication that the third location of the first wireless device is valid.

2. The method of claim 1, further comprising:
   receiving third CSI data representing channel properties of the wireless channel at a different time than receiving the second CSI data, wherein the first wireless device is located at a fourth location at the different time;
   determining that (v) a size of the third CSI data exceeds the first threshold or (vi) the third CSI data is received in a third specified time interval;
   determining a parameter value associated with the third CSI data;

determining that the fourth location of the first wireless device is not valid using the parameter value;
determining, using the third CSI data, a confidence score; and
determining that the confidence score is greater than a confidence threshold, wherein the confidence threshold represents a lowest confidence value acceptable for validating the fourth location; and
sending, to the user device, a third indication that the fourth location of the first wireless device is valid.

3. The method of claim 1, further comprising
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the third CSI data is received in a third specified time interval;
determining a parameter value associated with the third CSI data;
determining that the fourth location of the first wireless device is not valid using the parameter value;
determining, using the third CSI data, a confidence score;
determining that the confidence score is less than a confidence threshold, wherein the confidence threshold represents a lowest confidence value acceptable for validating the fourth location; and
sending, to the user device, a third indication that the fourth location of the first wireless device is not valid.

4. The method of claim 1, further comprising
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the third CSI data is received in a third specified time interval;
determining a parameter value associated with the third CSI data;
determining that the fourth location of the first wireless device is not valid using the parameter value;
determining that the third CSI data does not match historical data; and
sending, to the user device, a request to change a location of one or more of the first wireless device and the second wireless device.

5. The method of claim 1, wherein determining that the second CSI data corresponds to the first ground truth data or the second ground truth data comprises determining a parameter value associated with the second CSI data, wherein the parameter value is at least one of a mean, a Fast Fourier Transform (FFT) mean, a standard deviation, or an FFT standard deviation.

6. The method of claim 1, further comprising:
receiving third CSI data representing channel properties of the wireless channel at a different time than receiving the second CSI data, wherein the first wireless device is at a fourth location at the different time;
determining that a size of the third CSI data does not exceed the first threshold or the second CSI data is not received in a third specified time interval;
identifying a network issue with the wireless channel using at least one of the third CSI data, receive signal strength indicator (RSSI) data, airtime utilization data, or congestion statistic data; and
sending, to the user device, a third indication that the fourth location of the first wireless device is not valid.

7. The method of claim 1, further comprising:
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the second CSI data is received in a third specified time interval;
calculating a parameter value using the third CSI data;
determining that the parameter value is less than a second threshold representing no motion in the environment; or
determining that the parameter value is greater than a third threshold representing motion in the environment; and
sending, to the user device, a third indication that the fourth location of the first wireless device is valid.

8. A non-transitory computer readable storage medium storing instructions that, when executed by a processing device, cause the processing device to perform operations comprising:
receiving, at a first time, first channel state information (CSI) data representing channel properties of a wireless channel used by a first wireless device and a second wireless device, wherein the first wireless device is located at a first location in an environment and the second wireless device is located at a second location in the environment;
determining that (i) a size of the first CSI data is less than a first threshold or (ii) the first CSI data is not received in a first specified time interval;
sending, to a user device, a first indication that the first location of the first wireless device is not valid;
receiving, at a second time after the first time, second CSI data representing channel properties of the wireless channel, wherein the first wireless device is located at a third location at the second time;
determining that (iii) a size of the second CSI data exceeds the first threshold or (iv) the second CSI data is received in a second specified time interval;
determining that the second CSI data corresponds to first ground truth data and indicates that there is no motion in the environment; or
determining that the second CSI data corresponds to second ground truth data and indicates that there is motion in the environment; and
sending, to the user device, a second indication that the third location of the first wireless device is valid.

9. The computer readable storage medium of claim 8, wherein the operations further comprises:
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the third CSI data is received in a third specified time interval;
determining a parameter value associated with the third CSI data;
determining that the fourth location of the first wireless device is not valid using the parameter value;
determining, using the third CSI data, a confidence score; and
determining that the confidence score is greater than a confidence threshold, wherein the confidence threshold represents a lowest confidence value acceptable for validating the fourth location; and sending, to the user device, a third indication that the fourth location of the first wireless device is valid.

10. The computer readable storage medium of claim 8, wherein the operations further comprises:
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the third CSI data is received in a third specified time interval;
determining a parameter value associated with the third CSI data;
determining that the fourth location of the first wireless device is not valid using the parameter value;
determining, using the third CSI data, a confidence score;
determining that the confidence score is less than a confidence threshold, wherein the confidence threshold represents a lowest confidence value acceptable for validating the fourth location; and
sending, to the user device, a third indication that the fourth location of the first wireless device is not valid.

11. The computer readable storage medium of claim 8, wherein the operations further comprises:
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the third CSI data is received in a third specified time interval;
determining a parameter value associated with the third CSI data;
determining that the fourth location of the first wireless device is not valid using the parameter value;
determining that the third CSI data does not match historical data; and
sending, to the user device, a request to change a location of one or more of the first wireless device and the second wireless device.

12. The computer readable storage medium of claim 8, wherein determining that the second CSI data corresponds to the first ground truth data or the second ground truth data comprises determining a parameter value associated with the second CSI data, wherein the parameter value is at least one of a mean, a Fast Fourier Transform (FFT) mean, a standard deviation, or an FFT standard deviation.

13. The computer readable storage medium of claim 8, wherein the operations further comprises:
receiving third CSI data representing channel properties of the wireless channel at a different time than receiving the second CSI data, wherein the first wireless device is at a fourth location at the different time;
determining that (v) a size of the third CSI data exceeds the first threshold or (vi) the third CSI data is received in a third specified time interval;
identifying a network issue with the wireless channel using at least one of the third CSI data, receive signal strength indicator (RSSI) data, airtime utilization data, or congestion statistic data; and
sending, to the user device, a third indication that the fourth location of the first wireless device is not valid.

14. The computer readable storage medium of claim 8, wherein the operations further comprises:
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the second CSI data is received in a third specified time interval;
calculating a parameter value using the third CSI data;
determining that the parameter value is less than a second threshold representing no motion in the environment; or
determining that the parameter value is greater than a third threshold representing motion in the environment; and
sending, to the user device, a third indication that the fourth location of the first wireless device is valid.

15. A computing system comprising:
a memory device that stores instructions; and
a processing device, operatively coupled to the memory device, executes the instructions to perform operations comprising:
receiving, at a first time, first channel state information (CSI) data representing channel properties of a wireless channel used by a first wireless device and a second wireless device, wherein the first wireless device is located at a first location in an environment and the second wireless device is located at a second location in the environment;
determining that (i) a size of the first CSI data is less than a first threshold or (ii) the first CSI data is not received in a first specified time interval;
sending, to a user device, a first indication that the first location of the first wireless device is not valid;
receiving, at a second time after the first time, second CSI data representing channel properties of the wireless channel, wherein the first wireless device is located at a third location at the second time;
determining that iii) a size of the second CSI data exceeds the first threshold or iv) the second CSI data is received in a second specified time interval;
determining that the second CSI data corresponds to first ground truth data and indicates that there is no motion in the environment; or
determining that the second CSI data corresponds to second ground truth data and indicates that there is motion in the environment; and
sending, to the user device, a second indication that the third location of the first wireless device is valid.

16. The computing system of claim 15, wherein the processing device executes the instructions to further perform operations comprising:
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the third CSI data is received in a third specified time interval;
determining a parameter value associated with the third CSI data;
determining that the fourth location of the first wireless device is not valid using the parameter value;
determining, using the third CSI data, a confidence score; and
determining that the confidence score is greater than a confidence threshold, wherein the confidence threshold represents a lowest confidence value acceptable for validating the fourth location; and sending, to the user device, a third indication that the fourth location of the first wireless device is valid.

17. The computing system of claim 15, wherein the processing device executes the instructions to further perform operations comprising:
receiving third CSI data representing channel properties of the wireless channel at a different time than receiving the second CSI data, wherein the first wireless device is located at a fourth location at the different time;
determining that (v) a size of the third CSI data exceeds the first threshold or (vi) the third CSI data is received in a third specified time interval;
determining a parameter value associated with the third CSI data;
determining that the fourth location of the first wireless device is not valid using the parameter value;
determining, using the third CSI data, a confidence score;
determining that the confidence score is less than a confidence threshold, wherein the confidence threshold represents a lowest confidence value acceptable for validating the fourth location; and
sending, to the user device, a third indication that the fourth location of the first wireless device is not valid.

* * * * *